US007196710B1

(12) United States Patent
Fouladi et al.

(10) Patent No.: US 7,196,710 B1
(45) Date of Patent: Mar. 27, 2007

(54) METHOD AND APPARATUS FOR BUFFERING GRAPHICS DATA IN A GRAPHICS SYSTEM

(75) Inventors: Farhad Fouladi, Los Altos Hills, CA (US); Robert Moore, Heathrow, FL (US)

(73) Assignee: Nintendo Co., Ltd., Kyoto (JP)

( * ) Notice: Subject to any disclaimer, the term of this patent is extended or adjusted under 35 U.S.C. 154(b) by 749 days.

(21) Appl. No.: 09/726,215

(22) Filed: Nov. 28, 2000

Related U.S. Application Data

(60) Provisional application No. 60/226,912, filed on Aug. 23, 2000.

(51) Int. Cl.
*G09G 5/36* (2006.01)
*G06T 1/60* (2006.01)
*G06T 1/00* (2006.01)

(52) U.S. Cl. .................. 345/553; 345/530; 345/501

(58) Field of Classification Search ............... 345/531, 345/503, 505, 554, 530, 553, 501, 541, 536, 345/522, 506, 559, 556; 709/328, 200; 711/110, 711/119; 710/52, 57, 33, 53; 712/227; 375/240.28; 382/154; 365/221
See application file for complete search history.

(56) References Cited

U.S. PATENT DOCUMENTS 4,275,413 A    6/1981 Sakamoto et al.

(Continued)

FOREIGN PATENT DOCUMENTS

CA      2070934       12/1993

(Continued)

OTHER PUBLICATIONS

Inside Sony's Next Generation Playstation, © 1999.

(Continued)

*Primary Examiner*—Ulka Chauhan
*Assistant Examiner*—Joni Hsu
(74) *Attorney, Agent, or Firm*—Nixon & Vanderhye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Techniques for efficiently buffering graphics data between a producer and a consumer within a low-cost graphics systems such as a 3D home video game overcome the problem that a small-sized FIFO buffer in the graphics hardware may not adequately load balance a producer and consumer—causing the producer to stall when the consumer renders bit primitives. One aspect of the invention solves this invention by allocating part of main memory to provide a variable number of variable sized graphics commands buffers. Applications can specify the number of buffers and the size of each. All writes to the graphics FIFO can be routed a buffer in main memory. The producer and consumer independently maintain their own read and write pointers, decoupling the producer from the consumer. The consumer does not write to the buffer, but uses its write pointer to keep track of data valid positions within the buffer. The producer can write a read command to a buffer that directs the consumer to read a string of graphics commands (e.g., display list) stored elsewhere in the memory, and to subsequently return to reading the rest of the buffer. Display lists can be created by simply writing a command that redirects the output of the producer to a display list buffer.

68 Claims, 15 Drawing Sheets

EXAMPLE DISPLAY LIST CALL FROM COMMAND FIFO

U.S. PATENT DOCUMENTS

| | | |
|---|---|---|
| 4,357,624 A | 11/1982 | Greenberg |
| 4,388,620 A | 6/1983 | Sherman |
| 4,425,559 A | 1/1984 | Sherman |
| 4,463,380 A | 7/1984 | Hooks, Jr. |
| 4,570,233 A | 2/1986 | Yan et al. |
| 4,586,038 A | 4/1986 | Sims et al. |
| 4,600,919 A | 7/1986 | Stern |
| 4,615,013 A | 9/1986 | Yan et al. |
| 4,625,289 A | 11/1986 | Rockwood |
| 4,658,247 A | 4/1987 | Gharachorloo |
| 4,692,880 A | 9/1987 | Merz et al. |
| 4,725,831 A | 2/1988 | Coleman |
| 4,808,988 A | 2/1989 | Burke et al. |
| 4,817,175 A | 3/1989 | Tenenbaum et al. |
| 4,829,295 A | 5/1989 | Hiroyuki |
| 4,855,934 A | 8/1989 | Robinson |
| 4,862,392 A | 8/1989 | Steiner |
| 4,866,637 A | 9/1989 | Gonzalez-Lopez et al. |
| 4,888,712 A | 12/1989 | Barkans et al. |
| 4,897,806 A | 1/1990 | Cook et al. |
| 4,901,064 A | 2/1990 | Deering |
| 4,907,174 A | 3/1990 | Priem |
| 4,914,729 A | 4/1990 | Omori et al. |
| 4,918,625 A | 4/1990 | Yan |
| 4,935,879 A | 6/1990 | Ueda |
| 4,945,500 A | 7/1990 | Deering |
| 4,974,176 A | 11/1990 | Buchner et al. |
| 4,974,177 A | 11/1990 | Nishiguchi |
| 4,989,138 A | 1/1991 | Radochonski |
| 5,003,496 A | 3/1991 | Hunt, Jr. et al. |
| 5,016,183 A | 5/1991 | Shyong |
| 5,018,076 A | 5/1991 | Johary et al. |
| 5,043,922 A | 8/1991 | Matsumoto |
| 5,062,057 A | 10/1991 | Blacken et al. |
| 5,091,967 A | 2/1992 | Ohsawa |
| 5,097,427 A | 3/1992 | Lathrop et al. |
| 5,109,520 A | 4/1992 | Knierim |
| 5,136,664 A | 8/1992 | Bersack et al. |
| 5,144,291 A | 9/1992 | Nishizawa |
| 5,170,468 A | 12/1992 | Shah et al. |
| 5,204,944 A | 4/1993 | Wolberg et al. |
| 5,224,208 A | 6/1993 | Miller, Jr. et al. |
| 5,239,624 A | 8/1993 | Cook et al. |
| 5,241,658 A | 8/1993 | Masterson et al. |
| 5,255,353 A | 10/1993 | Itoh |
| 5,268,995 A | 12/1993 | Diefendorff et al. |
| 5,268,996 A | 12/1993 | Steiner et al. |
| 5,278,948 A | 1/1994 | Luken, Jr. |
| 5,307,450 A | 4/1994 | Grossman |
| 5,315,692 A | 5/1994 | Hansen et al. |
| 5,345,541 A | 9/1994 | Kelley et al. |
| 5,353,424 A | 10/1994 | Partovi et al. |
| 5,357,579 A | 10/1994 | Buchner et al. |
| 5,361,386 A | 11/1994 | Watkins et al. |
| 5,363,475 A | 11/1994 | Baker et al. |
| 5,377,313 A | 12/1994 | Scheibl |
| 5,392,385 A | 2/1995 | Evangelisti et al. |
| 5,392,393 A | 2/1995 | Deering |
| 5,394,516 A | 2/1995 | Winser |
| 5,402,532 A | 3/1995 | Epstein et al. |
| 5,404,445 A | 4/1995 | Matsumoto |
| 5,408,650 A | 4/1995 | Arsenault |
| 5,412,796 A | 5/1995 | Olive |
| 5,415,549 A | 5/1995 | Logg |
| 5,416,606 A | 5/1995 | Katayama et al. |
| 5,421,028 A | 5/1995 | Swanson |
| 5,422,997 A | 6/1995 | Nagashima |
| 5,432,895 A | 7/1995 | Myers |
| 5,432,900 A | 7/1995 | Rhodes et al. |
| 5,438,663 A | 8/1995 | Matsumoto et al. |
| 5,448,689 A | 9/1995 | Matsuo et al. |
| 5,457,775 A | 10/1995 | Johnson, Jr. et al. |
| 5,461,712 A | 10/1995 | Chelstowski et al. |
| 5,467,438 A | 11/1995 | Nishio et al. |
| 5,467,459 A | 11/1995 | Alexander et al. |
| 5,469,535 A | 11/1995 | Jarvis et al. |
| 5,473,736 A | 12/1995 | Young |
| 5,475,803 A | 12/1995 | Stearns et al. |
| 5,487,146 A | 1/1996 | Guttag et al. |
| 5,490,240 A | 2/1996 | Foran et al. |
| 5,495,563 A | 2/1996 | Winser |
| 5,504,499 A | 4/1996 | Horie et al. |
| 5,504,917 A | 4/1996 | Austin |
| 5,506,604 A | 4/1996 | Nally et al. |
| 5,535,374 A | 7/1996 | Olive |
| 5,543,824 A | 8/1996 | Priem et al. |
| 5,544,292 A | 8/1996 | Winser |
| 5,548,709 A | 8/1996 | Hannah et al. |
| 5,553,228 A | 9/1996 | Erb et al. |
| 5,557,712 A | 9/1996 | Guay |
| 5,559,954 A | 9/1996 | Sakoda et al. |
| 5,561,746 A | 10/1996 | Murata et al. |
| 5,561,752 A | 10/1996 | Jevans |
| 5,563,989 A | 10/1996 | Billyard |
| 5,566,285 A | 10/1996 | Okada |
| 5,573,402 A | 11/1996 | Gray |
| 5,579,456 A | 11/1996 | Cosman |
| 5,586,234 A | 12/1996 | Sakuraba et al. |
| 5,593,350 A | 1/1997 | Bouton et al. |
| 5,594,854 A | 1/1997 | Baldwin et al. |
| 5,600,763 A | 2/1997 | Greene et al. |
| 5,606,650 A | 2/1997 | Kelley et al. |
| 5,607,157 A | 3/1997 | Nagashima |
| 5,608,424 A | 3/1997 | Takahashi et al. |
| 5,608,864 A | 3/1997 | Bindlish et al. |
| 5,616,031 A | 4/1997 | Logg |
| 5,621,867 A | 4/1997 | Murata et al. |
| 5,628,686 A | 5/1997 | Svancarek et al. |
| 5,638,535 A | 6/1997 | Rosenthal et al. |
| 5,644,364 A | 7/1997 | Kurtze et al. |
| 5,649,082 A | 7/1997 | Burns |
| 5,650,955 A | 7/1997 | Puar et al. |
| 5,651,104 A | 7/1997 | Cosman |
| 5,657,045 A | 8/1997 | Katsura et al. |
| 5,657,443 A | 8/1997 | Krech, Jr. |
| 5,657,478 A | 8/1997 | Recker et al. |
| 5,659,671 A | 8/1997 | Tannenbaum et al. |
| 5,659,673 A | 8/1997 | Nonoshita |
| 5,659,715 A | 8/1997 | Wu et al. |
| 5,664,162 A | 9/1997 | Dye |
| 5,666,439 A | 9/1997 | Ishida et al. |
| 5,678,037 A | 10/1997 | Osugi et al. |
| 5,682,522 A | 10/1997 | Huang et al. |
| 5,684,941 A | 11/1997 | Dye |
| 5,687,304 A | 11/1997 | Kiss |
| 5,687,357 A | 11/1997 | Priem |
| 5,691,746 A | 11/1997 | Shyu |
| 5,694,143 A | 12/1997 | Fielder et al. |
| 5,696,892 A | 12/1997 | Redmann et al. |
| 5,701,444 A | 12/1997 | Baldwin |
| 5,703,806 A | 12/1997 | Puar et al. |
| 5,706,481 A | 1/1998 | Hannah et al. |
| 5,706,482 A | 1/1998 | Matsushima et al. |
| 5,714,981 A | 2/1998 | Scott-Jackson et al. |
| 5,721,947 A | 2/1998 | Priem et al. |
| 5,724,561 A | 3/1998 | Tarolli et al. |
| 5,726,689 A | 3/1998 | Negishi et al. |
| 5,726,947 A | 3/1998 | Yamazaki et al. |
| 5,727,192 A | 3/1998 | Baldwin |
| 5,734,386 A | 3/1998 | Cosman |
| 5,739,819 A | 4/1998 | Bar-Nahum |
| 5,740,343 A | 4/1998 | Tarolli et al. |
| 5,740,383 A | 4/1998 | Nally et al. |
| 5,740,406 A | 4/1998 | Rosenthal et al. |

| Patent | Date | Inventor(s) | | Patent | Date | Inventor(s) |
|---|---|---|---|---|---|---|
| 5,742,749 A | 4/1998 | Foran et al. | | 5,880,737 A | 3/1999 | Griffen et al. |
| 5,742,788 A | 4/1998 | Priem et al. | | 5,883,638 A | 3/1999 | Rouet et al. |
| 5,745,118 A | 4/1998 | Alcorn et al. | | 5,886,701 A | 3/1999 | Chauvin et al. |
| 5,745,125 A | 4/1998 | Deering et al. | | 5,886,705 A | 3/1999 | Lentz |
| 5,748,199 A | 5/1998 | Palm | | 5,887,155 A | 3/1999 | Laidig |
| 5,748,986 A | 5/1998 | Butterfield et al. | | 5,890,190 A | 3/1999 | Rutman |
| 5,751,291 A | 5/1998 | Olsen et al. | | 5,892,517 A | 4/1999 | Rich |
| 5,751,292 A | 5/1998 | Emmot | | 5,892,974 A | 4/1999 | Koizumi et al. |
| 5,751,295 A | 5/1998 | Becklund et al. | | 5,894,300 A | 4/1999 | Takizawa |
| 5,751,930 A | 5/1998 | Katsura et al. | | 5,900,881 A | 5/1999 | Ikedo |
| 5,754,191 A | 5/1998 | Mills et al. | | 5,903,283 A | 5/1999 | Selwan et al. |
| 5,754,839 A * | 5/1998 | Pardo et al. ............... 712/227 | | 5,909,218 A | 6/1999 | Naka et al. |
| 5,757,382 A | 5/1998 | Lee | | 5,909,225 A | 6/1999 | Schinnerer et al. |
| 5,758,182 A | 5/1998 | Rosenthal et al. | | 5,912,675 A | 6/1999 | Laperriere |
| 5,760,783 A | 6/1998 | Migdal et al. | | 5,912,676 A | 6/1999 | Malladi et al. |
| 5,764,228 A | 6/1998 | Baldwin | | 5,914,721 A | 6/1999 | Lim |
| 5,764,237 A | 6/1998 | Kaneko | | 5,914,725 A | 6/1999 | Macinnis et al. |
| 5,764,243 A | 6/1998 | Baldwin | | 5,914,729 A | 6/1999 | Lippincott |
| 5,767,856 A | 6/1998 | Peterson et al. | | 5,917,496 A | 6/1999 | Fujita et al. |
| 5,767,858 A | 6/1998 | Kawase et al. | | 5,920,326 A | 7/1999 | Rentschler et al. |
| 5,768,626 A | 6/1998 | Munson et al. | | 5,920,876 A | 7/1999 | Ungar et al. |
| 5,768,629 A | 6/1998 | Wise et al. | | 5,923,332 A | 7/1999 | Izawa |
| 5,774,133 A | 6/1998 | Neave et al. | | 5,923,334 A | 7/1999 | Luken |
| 5,777,623 A | 7/1998 | Small | | 5,926,182 A | 7/1999 | Menon et al. |
| 5,777,629 A | 7/1998 | Baldwin | | 5,926,647 A | 7/1999 | Adams et al. |
| 5,781,927 A | 7/1998 | Wu et al. | | 5,933,150 A | 8/1999 | Ngo et al. |
| 5,791,994 A | 8/1998 | Hirano et al. | | 5,933,154 A | 8/1999 | Howard et al. |
| 5,798,770 A | 8/1998 | Baldwin | | 5,933,155 A | 8/1999 | Akeley |
| 5,801,706 A | 9/1998 | Fujita et al. | | 5,933,529 A | 8/1999 | Kim |
| 5,801,711 A | 9/1998 | Koss et al. | | 5,936,641 A | 8/1999 | Jain et al. |
| 5,801,716 A | 9/1998 | Silverbrook | | 5,936,683 A | 8/1999 | Lin |
| 5,801,720 A | 9/1998 | Norrod et al. | | 5,940,086 A | 8/1999 | Rentschler et al. |
| 5,805,175 A | 9/1998 | Priem | | 5,940,089 A | 8/1999 | Dilliplane et al. |
| 5,805,868 A | 9/1998 | Murphy | | 5,940,538 A | 8/1999 | Spiegel et al. |
| 5,808,619 A | 9/1998 | Choi et al. | | 5,943,058 A | 8/1999 | Nagy |
| 5,808,630 A | 9/1998 | Pannell | | 5,943,060 A | 8/1999 | Cosman et al. |
| 5,809,219 A | 9/1998 | Pearce et al. | | 5,945,997 A | 8/1999 | Zhao et al. |
| 5,809,278 A | 9/1998 | Watanabe et al. | | 5,949,421 A | 9/1999 | Ogletree et al. |
| 5,815,165 A | 9/1998 | Blixt | | 5,949,423 A | 9/1999 | Olsen |
| 5,815,166 A | 9/1998 | Baldwin | | 5,949,424 A | 9/1999 | Cabral et al. |
| 5,818,456 A | 10/1998 | Cosman et al. | | 5,949,428 A | 9/1999 | Toelle et al. |
| 5,819,017 A | 10/1998 | Akeley et al. | | 5,949,440 A | 9/1999 | Krech, Jr. et al. |
| 5,821,940 A | 10/1998 | Morgan et al. | | 5,956,042 A | 9/1999 | Tucker et al. |
| 5,821,949 A | 10/1998 | Deering | | 5,956,043 A | 9/1999 | Jensen |
| 5,822,516 A | 10/1998 | Krech, Jr. | | 5,958,020 A | 9/1999 | Evoy et al. |
| 5,828,382 A | 10/1998 | Wilde | | 5,959,640 A | 9/1999 | Rudin et al. |
| 5,828,383 A | 10/1998 | May et al. | | 5,963,220 A | 10/1999 | Lee et al. |
| 5,828,907 A | 10/1998 | Wise et al. | | 5,966,134 A | 10/1999 | Arias |
| 5,831,624 A | 11/1998 | Tarolli et al. | | 5,969,726 A | 10/1999 | Rentschler et al. |
| 5,831,625 A | 11/1998 | Rich et al. | | 5,977,979 A | 11/1999 | Clough et al. |
| 5,831,640 A | 11/1998 | Wang et al. | | 5,977,984 A | 11/1999 | Omori |
| 5,835,096 A | 11/1998 | Baldwin | | 5,982,376 A | 11/1999 | Abe et al. |
| 5,835,792 A | 11/1998 | Wise et al. | | 5,982,390 A | 11/1999 | Stoneking et al. |
| 5,838,334 A * | 11/1998 | Dye ............... 345/503 | | 5,986,659 A | 11/1999 | Gallery et al. |
| 5,844,576 A | 12/1998 | Wilde et al. | | 5,986,663 A | 11/1999 | Wilde |
| 5,850,229 A | 12/1998 | Edelsbrunner et al. | | 5,986,677 A | 11/1999 | Jones et al. |
| 5,852,451 A | 12/1998 | Cox et al. | | 5,987,567 A | 11/1999 | Rivard et al. |
| 5,856,829 A | 1/1999 | Gray, III et al. | | 5,990,903 A | 11/1999 | Donovan |
| 5,859,645 A | 1/1999 | Latham | | 5,995,120 A | 11/1999 | Dye |
| 5,861,888 A | 1/1999 | Dempsey | | 5,995,121 A | 11/1999 | Alcokrn et al. |
| 5,861,893 A | 1/1999 | Strugess | | 5,999,189 A | 12/1999 | Kajiya et al. |
| 5,867,166 A | 2/1999 | Myhrvold et al. | | 5,999,196 A | 12/1999 | Storm et al. |
| 5,870,097 A | 2/1999 | Snyder et al. | | 5,999,198 A | 12/1999 | Horan et al. |
| 5,870,098 A | 2/1999 | Gardiner | | 6,002,407 A | 12/1999 | Fadden |
| 5,870,102 A | 2/1999 | Tarolli et al. | | 6,002,409 A | 12/1999 | Harkin |
| 5,870,109 A | 2/1999 | McCormack et al. | | 6,002,410 A | 12/1999 | Battle |
| 5,870,587 A | 2/1999 | Danforth et al. | | 6,005,582 A | 12/1999 | Gabriel et al. |
| 5,872,902 A | 2/1999 | Kuchkuda et al. | | 6,005,583 A | 12/1999 | Morrison |
| 5,874,969 A | 2/1999 | Storm et al. | | 6,005,584 A | 12/1999 | Kitamura et al. |
| 5,877,741 A | 3/1999 | Chee et al. | | 6,007,428 A | 12/1999 | Nishiumi et al. |
| 5,877,770 A | 3/1999 | Hanaoka | | 6,008,820 A | 12/1999 | Chauvin et al. |
| 5,877,771 A | 3/1999 | Drebin et al. | | 6,011,562 A | 1/2000 | Gagne et al. |
| 5,880,736 A | 3/1999 | Peercy et al. | | 6,011,565 A | 1/2000 | Kuo et al. |

| | | | | | | |
|---|---|---|---|---|---|---|
| 6,014,144 A | 1/2000 | Nelson et al. | | 6,112,267 A * | 8/2000 | McCormack et al. ......... 710/52 |
| 6,016,150 A | 1/2000 | Lengyel et al. | | 6,115,047 A | 9/2000 | Deering |
| 6,016,151 A | 1/2000 | Lin | | 6,115,049 A | 9/2000 | Winner et al. |
| 6,018,350 A | 1/2000 | Lee et al. | | 6,118,462 A | 9/2000 | Margulis |
| 6,020,931 A | 2/2000 | Bilbrey et al. | | 6,128,026 A | 10/2000 | Brothers, III |
| 6,021,417 A | 2/2000 | Massarksy | | 6,144,365 A | 11/2000 | Young et al. |
| 6,022,274 A | 2/2000 | Takeda et al. | | 6,144,387 A | 11/2000 | Liu et al. |
| 6,023,261 A | 2/2000 | Ugajin | | 6,151,602 A | 11/2000 | Hejlsberg et al. |
| 6,023,738 A | 2/2000 | Priem et al. | | 6,155,926 A | 12/2000 | Miyamoto et al. |
| 6,025,853 A | 2/2000 | Baldwin | | 6,157,387 A | 12/2000 | Kotani |
| 6,026,182 A | 2/2000 | Lee et al. | | 6,166,748 A | 12/2000 | Van Hook et al. |
| 6,028,608 A | 2/2000 | Jenkins | | 6,172,678 B1 | 1/2001 | Shiraishi |
| 6,028,611 A | 2/2000 | Anderson et al. | | 6,173,367 B1 | 1/2001 | Aleksic et al. |
| 6,031,542 A | 2/2000 | Wittig | | 6,177,944 B1 | 1/2001 | Fowler et al. |
| 6,035,360 A | 3/2000 | Doidge et al. | | 6,181,352 B1 | 1/2001 | Kirk et al. |
| 6,037,948 A | 3/2000 | Liepa | | 6,191,794 B1 | 2/2001 | Priem et al. |
| 6,037,949 A | 3/2000 | DeRose et al. | | 6,198,488 B1 | 3/2001 | Lindholm et al. |
| 6,038,031 A | 3/2000 | Murphy | | 6,200,253 B1 | 3/2001 | Nishiumi et al. |
| 6,038,348 A | 3/2000 | Carley | | 6,204,851 B1 | 3/2001 | Netschke et al. |
| 6,038,619 A * | 3/2000 | Berning et al. .............. 710/33 | | 6,215,496 B1 | 4/2001 | Szeliski et al. |
| 6,040,843 A | 3/2000 | Monroe et al. | | 6,215,497 B1 | 4/2001 | Leung |
| 6,040,844 A | 3/2000 | Yamaguchi et al. | | 6,226,012 B1 | 5/2001 | Priem et al. |
| 6,041,010 A | 3/2000 | Puar et al. | | 6,226,713 B1 | 5/2001 | Mehrotra |
| 6,043,804 A | 3/2000 | Greene | | 6,232,981 B1 | 5/2001 | Gossett |
| 6,043,821 A | 3/2000 | Sprague et al. | | 6,236,413 B1 | 5/2001 | Gossett et al. |
| 6,046,746 A | 4/2000 | Deering | | 6,239,810 B1 | 5/2001 | Van Hook et al. |
| 6,046,747 A | 4/2000 | Saunders et al. | | 6,252,608 B1 | 6/2001 | Snyder et al. |
| 6,046,752 A | 4/2000 | Kirkland et al. | | 6,252,610 B1 | 6/2001 | Hussain |
| 6,049,337 A | 4/2000 | Van Overveld | | 6,264,558 B1 | 7/2001 | Nishiumi et al. |
| 6,049,338 A | 4/2000 | Anderson et al. | | 6,268,861 B1 | 7/2001 | Sanz-Pastor et al. |
| 6,052,125 A | 4/2000 | Gardiner et al. | | 6,275,235 B1 | 8/2001 | Morgan, III |
| 6,052,126 A | 4/2000 | Sakuraba et al. | | 6,285,779 B1 | 9/2001 | Lapidous et al. |
| 6,052,127 A | 4/2000 | Vaswani et al. | | 6,292,194 B1 | 9/2001 | Powll, III |
| 6,052,129 A | 4/2000 | Fowler et al. | | 6,329,997 B1 | 12/2001 | We et al. |
| 6,052,133 A | 4/2000 | Kang | | 6,331,856 B1 | 12/2001 | Van Hook et al. |
| 6,054,993 A | 4/2000 | Devic et al. | | 6,339,428 B1 | 1/2002 | Fowler et al. |
| 6,054,999 A | 4/2000 | Strandberg | | 6,342,892 B1 | 1/2002 | Van Hook et al. |
| 6,057,847 A | 5/2000 | Jenkins | | 6,353,438 B1 | 3/2002 | Van Hook et al. |
| 6,057,849 A | 5/2000 | Haubner et al. | | 6,356,497 B1 | 3/2002 | Puar et al. |
| 6,057,851 A | 5/2000 | Luken et al. | | 6,408,362 B1 | 6/2002 | Arimilli et al. |
| 6,057,852 A | 5/2000 | Krech, Jr. | | 6,417,858 B1 | 7/2002 | Bosch et al. |
| 6,057,859 A | 5/2000 | Handelman et al. | | 6,426,747 B1 | 7/2002 | Hoppe et al. |
| 6,057,861 A | 5/2000 | Lee et al. | | 6,429,876 B1 | 8/2002 | Morein |
| 6,057,862 A | 5/2000 | Margulis | | 6,437,781 B1 | 8/2002 | Tucker et al. |
| 6,057,863 A | 5/2000 | Olarig | | 6,459,429 B1 | 10/2002 | Deering |
| 6,061,462 A | 5/2000 | Tostevin et al. | | 6,466,223 B1 | 10/2002 | Dorbie et al. |
| 6,064,392 A | 5/2000 | Rohner | | 6,469,707 B1 | 10/2002 | Voorhies |
| 6,067,098 A | 5/2000 | Dye | | 6,470,403 B1 * | 10/2002 | Houg .......................... 710/57 |
| 6,070,204 A | 5/2000 | Poisner | | 6,476,808 B1 | 11/2002 | Kuo et al. |
| 6,072,496 A | 6/2000 | Guenter et al. | | 6,476,822 B1 | 11/2002 | Burbank |
| 6,075,543 A | 6/2000 | Akeley | | 6,496,187 B1 | 12/2002 | Deering et al. |
| 6,075,546 A | 6/2000 | Hussain et al. | | 6,501,479 B1 | 12/2002 | Root et al. |
| 6,078,311 A | 6/2000 | Pelkey | | 6,553,426 B2 * | 4/2003 | Holzle et al. ............... 719/310 |
| 6,078,333 A | 6/2000 | Wittig et al. | | 6,567,091 B2 | 5/2003 | Dye et al. |
| 6,078,334 A | 6/2000 | Hanaoka et al. | | 6,674,805 B1 * | 1/2004 | Kovacevic et al. .... 375/240.28 |
| 6,078,338 A | 6/2000 | Horan et al. | | 6,675,239 B1 | 1/2004 | Van Hook et al. |
| 6,081,274 A | 6/2000 | Shiraishi | | 6,704,023 B1 | 3/2004 | Wu et al. |
| 6,088,035 A | 7/2000 | Sudarsky et al. | | 6,801,203 B1 | 10/2004 | Hussain |
| 6,088,042 A | 7/2000 | Handelman et al. | | 6,807,620 B1 | 10/2004 | Suzuoki et al. |
| 6,088,487 A | 7/2000 | Kurashige | | 6,937,242 B2 | 8/2005 | Wu et al. |
| 6,088,701 A | 7/2000 | Whaley et al. | | | | |
| 6,091,431 A | 7/2000 | Saxena et al. | | FOREIGN PATENT DOCUMENTS | | |
| 6,092,124 A | 7/2000 | Priem et al. | | | | |
| 6,092,158 A | 7/2000 | Harriman et al. | | EP | 0 637 813 A2 | 2/1995 |
| 6,094,200 A | 7/2000 | Olsen et al. | | EP | 1 074 945 | 2/2001 |
| 6,097,435 A | 8/2000 | Stanger et al. | | EP | 1 075 146 | 2/2001 |
| 6,097,437 A | 8/2000 | Hwang | | EP | 1 081 649 | 3/2001 |
| 6,104,415 A | 8/2000 | Gossett | | JP | 9-330230 | 12/1997 |
| 6,104,417 A | 8/2000 | Nielsen et al. | | JP | 11053580 | 2/1999 |
| 6,105,094 A | 8/2000 | Lindeman | | JP | 11076614 | 3/1999 |
| 6,108,743 A | 8/2000 | Debs et al. | | JP | 11161819 | 6/1999 |
| 6,111,582 A | 8/2000 | Jenkins | | JP | 11203500 | 7/1999 |
| 6,111,584 A | 8/2000 | Murphy | | JP | 11226257 | 8/1999 |

| | | |
|---|---|---|
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO/93/04429 | 3/1993 |
| WO | WO 94/10641 | 5/1994 |

OTHER PUBLICATIONS

Press Releases, Mar. 18, 1999.
Chris Johnston, "PlayStation Part Deux", Press Start, © 1999.
Nikkei Shimbun, "Sony Making SME, Chemical and SPT into Wholly-Owned Subsidiaries", Mar. 9, 1999.
AM News: Japanese Developers Not All Sold on PS2, Next Generation, Mar. 16, 1999.
Sony To Turn PlayStation Maker Into Wholly Owned Unit-Nikkei, Dow Jones News Service, Mar. 8, 1999.
Yumiko Ono, Sony Antes Up Its Chips In Bet On New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.
Dreamcast Instruction Manual, Sega Enterprises, Ltd., © 1998.
"Sega To Launch Video Camera for Dreamcast", Reuters Business News, Feb. 16, 2000.
David Pescovitz, "Dream On", Wired, Aug. 1999.
Randy Nelson, "Dreamcast 101: Everything You Ever Wanted To Know About Sega's Powerful New Console", Official Sega Dreamcast Magazine, Jun. 1999.
2D/3D Graphics Card User Manual, Guillemot © 1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving The PlayStation II", Wired, Nov. 1999.
Introducing The Next Generation PlayStation, Sony Computer Entertainment Inc., © 1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second-Depth Shadow Mapping", Department of Computer Science, Univ. N.C, Chapel Hill, N.C. pp. 1-7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994, pp. 433-437.
James F. Blinn, "Simulationof Wrinkled Surfaces," Caltech/JPL, pp. 286-292, SIGGRAPH 78 (1978).
Tomas Möller and Eric Haines "Real-Time Rendering", AK Peters, Ltd., © 1999, pp. 127-142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump-mapping Choices and Concepts, Jun. 7, 2000, www.nvidia.com.
Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump-mapping for Today's GPUs, Mar. 17, 2000 www.nvidia.com.
Technical Presentation: Shadows, Transparency, & Fog, Mar. 17, 2000 www.nvidia.com.
Technical Presentation: GeForce 256 Register Combiners, Mar. 17, 2000, www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per-Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley, "GeForce 1 & 2 GPU Speed Tests", May 11, 2000, www.g256.com.
"Dreamcast: The Full Story", Next Generation, Sep. 1998.
DirectX 7.0 Programmer's Reference, Microsoft Corporation, 1995-1999 (as part of the DirectX 7.0 SDK on the Companion CD included with "Inside Direct3D", Microsoft Programming Series, Peter J. Kovach, Microsoft Press, 1999).
"Inside Direct3D", Microsoft Programming Series, Peter J. Kovach, Microsoft Press, 1999.
"OpenGL Programming Guide, The Official Guide to Learning OpenGL, Release 1", Jackie Nieder, Tom David, Mason Woo, Addision-Wesley Publishing Co., 1993.
"Procedural Elements for Computer Graphics," Second Edition, David F. Rogers, McGraw Hill, 1998.
"Real-Time Rendering," Thomas Molleir, Eric Haines, AK Peters, 1999.

"Computer Graphics, Principles and Practice," Second Edition, The Systems Programming Series, Foley, van Dam, Fiener, Hughes, Addison Wesley, 1990.

"Principles of Three-Dimensional Computer Animation", Revised Edition, Michael O'Rourke, W.W. Norton & Company, 1998.

Debevec, Paul, et al., "Efficient View-Dependent Image-Based Rendering with Projective Texture-Mapping," University of California at Berkeley.

Gibson, Simon, et al., "Interactive Rendering with Real-World Illumination," Rendering Techniques 2000; 11th Eurographics Workshop on Rendering, pp. 365-376 (Jun. 2000).

Segal, Mark, et al., "Fast Shadows and Lighting Effects Using Texture Mapping,"Computer Graphics, 26, 2, pp. 249-252 (Jul. 1992).

White paper, Kilgard, Mark J., "Improving Shadows and Reflections via the Stencil Buffer" (Nov. 3, 1999).

"OpenGL Projected Textures," from web site:HTTP:// reality.sgi.com, 5 pages.

"5.13.1 How to Project a Texture," from web site: www.sgi.com, 2 pages.

Arkin, Alan, email, subject: "Texture distortion problem," from web site: HTTP://reality.sgi.com (Jul. 1997).

Moller, Tomas et al., "Real-Time Rendering," pp. 179-183 (AK Peters Ltd., 1999).

Williams, Lance, "Casting Curved Shadows on Curved Surfaces," Computer Graphics (SIGGRAPH '78 Proceedings), vol. 12, No. 3, pp. 270-274 (Aug. 1978).

Woo et al., "A Survey of Shadow Algorithms," IEEE Computer Graphics and Applications, vol. 10, No. 6, pp. 13-32 (Nov. 1990).

Heidrich et al., "Applications of Pixel Textures in Visualization and Realistic Image Synthesis," Proceedings 1999 Symposium On Interactive 3D Graphics, pp. 127-134 (Apr. 1999).

Hourcade et al, "Algorithms for Antialiased Cast Shadows", Computers and Graphics, vol. 9, No. 3, pp. 260-265 (1985).

Michael McCool, "Shadow Volume Reconstruction from Depth Maps", ACM Transactions on Graphics, vol. 19, No. 1, Jan. 2000, pp. 1-26.

RenderMan Artist Tools, PhotoRealistic RenderMan 3.8 User's Manual, Pixar (Aug. 1998).

RenderMan Interface Version 3.2 (Jul. 2000).

White paper, Dietrich, Sim, "Cartoon Rendering and Advanced Texture Features of the GeForce 256 Texture Matrix, Projective Textures, Cube Maps, Texture Coordinate Generation and DOTPRODUCT3 Texture Blending" (Dec. 16, 1999).

Peter J. Kovach, Inside Direct 3D, "Alpha Testing," pp. 289-291 (1999).

Web site information, CartoonReyes, REM Infografica, http://www.digimotion.co.uk/cartoonreyes.htm.

Raskar, Ramesh et al., "Image Precision Silhouette Edges," Symposium on Interactive 3D Graphics1999, Atlanta, 7 pages (Apr. 26-29, 1999).

Schlechtweg, Stefan et al., Rendering Line-Drawings with Limited Resources, Proceedings of GRAPHICON '96, 6th International Conference and Exhibition on Computer Graphics and Visualization in Russia, (St. Petersburg, Jul. 1-5, 1996) vol. 2, pp. 131-137.

Haeberli, Paul et al., "Texture Mapping as a Fundamental Drawing Primitive," Proceedings of the Fourth Eurographics Workshop on Rendering, 11pages, Paris, France (Jun. 1993).

Schlechtweg, Stefan et al., "Emphasising in Line-drawings," Norsk samarbeid innen grafisk databehandling: NORSIGD Info, medlemsblad for NORSIGD, Nr 1/95, pp. 9-10.

Markosian, Lee et al., "Real-Time Nonphotorealistic Rendering," Brown University site of the NSF Science and Technology Center for Computer Graphics and Scientific Visualization, Providence, RI, 5 pages (undated).

Feth, Bill, "Non-Photorealistic Rendering," wif3@cornell.edu, CS490—Bruce Land, 5 pages (Spring 1998).

Elber, Gershon, "Line Art Illustrations of Parametric and Implicit Forms," IEEE Transactions on Visualization and Computer Graphics, vol. 4, No. 1, Jan.-Mar. 1998.

Zeleznik, Robert et al."SKETCH: An Interface for Sketching 3D Scenes," Computer Graphics Proceedings Annual Conference Series 1996, pp. 163-170.

Computer Graphics World, Dec. 1997.

Reynolds, Craig, "Stylized Depiction in Computer Graphics, Non-Photorealistic, Painterly and 'Toon Rendering," an annotated survey of online resources, 13 pages, last update May 30, 2000, http://www.red.com/cwr/painterly.html.

Render Man Artist Tools, Using Arbitrary Output Variables in Photorealistic Renderman (With Applications), PhotoRealistic Renderman Application Note #24, 8 pages, Jun. 1998, http://www.pixar.com/products/renderman/toolkit/Toolkit/AppNotes/appnote.24.html.

Decaudin, Phillipe, "Cartoon-Looking Rendering of 3D Scenes," Syntim Project Inria, 6 pages , http://www-syntim.inria.fr/syntim/recherche/decaudin/cartoon-eng.html.

Hachigian, Jennifer, "Super Cel Shader 1.00 Tips and Tricks," 2 pages, wysiwyg://thePage.13/http://members.xoom.com/_XMCM.jarvia/3D/celshade.html.

Digimation Inc., "The Incredible Comicshop," info sheet, 2 pages, http://www.digimation.com/asp/product/asp?product_id=33.

Softimage/3D Full Support, "Toon Assistant," 1998 Avid Technology, Inc., 1 page, http://www.softimage.com/3dsupport/techn...uments/3.8/features3.8/rel_notes.56.html.

Cambridge Animo—Scene III, info sheet, Cambridge Animation Systems, 2 pages, http://www.cam-ani.co.uk/casweb/products/software/ScenelII.htm.

Mulligan, Vikram, Toon, info sheet, 2 pages, http://digitalcarversguild.com/products/toon/toon.thml.

Toony Shaders, "Dang I'm tired of photorealism," 4 pages, http://www.visi.com/~mcdonald/toony.html.

"Cartoon Shading, Using Shading Mapping," 1 page, http://www.goat.com/alias/shaders.html#toonshad.

Web site information, CartoonReyes, http://www.zentertainment.com/zentropy/review/cartoonreyes.html.

VIDI Presenter 3D Repository, "Shaders." 2 pages, http://www.webnation.com/vidirep/panels/renderman/shaders/toon.phtml.

The RenderMan Interface Version 3.1, (Sep. 1989).

"Renderman Artist Tools, PhotoRealistic RenderMan Tutorial," Pixar (Jan. 1996).

Web site materials, "Renderman Artist Tools, PhotoRealistic RenderMan 3.8 User's Manual," Pixar.

NVIDIA.com, technical presentation, "AGDC Per-Pixel Shading" (Nov. 15, 2000).

NVIDIA.com, technical presentation, Introduction to DX8 Pixel Shaders (Nov. 10, 2000).

NVIDIA.com, technical presentation, "Advanced Pixel Shader Details" (Nov. 10, 2000).

"Developer's Lair, Multitexturing with the ATI Rage Pro," (7 pages) from ati.com web site (2000).

Slide Presentation, Sébastien Dominé, "nVIDIA Mesh Skinning, OpenGl".

Singh, Karan et al., "Skinning Characters using Surface-Oriented Free-Form Deformations," Toronto Canada.

"Hardware Technology," from ATI.com web site, 8 pages (2000).

"Skeletal Animation and Skinning," from ATI.com web site, 2 pages (Summer 2000).

"Developer Relations, ATI Summer 2000 Developer Newsletter," from ATI.com web site, 5 pages (Summer 2000).

Press Releases, "ATI's RADEON family of products delivers the most comprehensive support for the advance graphics features of DirectX 8.0," Canada, from ATI.com web site, 2 pages (Nov. 9, 2000).

"ATI RADEON Skinning and Tweening," from ATI.com web site, 1 page (2000).

Hart, Evan et al., "Vertex Shading with Direct3D and OpenGL," Game Developers Conference 2001, from ATI.com web site (2001).

Search Results for: skinning, from ATI.com web site, 5 pages (May 24, 2001).

Hart, Evan et al., "Graphics by rage," Game Developers Conference 2000, from ATI.com web site (2000).

Efficient Command/Data Interface Protocol For Graphics, IBM TDB, vol. 36, issue 9A, Sep. 1, 1993, pp. 307-312.

Shade, Jonathan et al., "Layered Depth Images," Computer Graphics Proceedings, Annnual Conference Series, pp. 231-242 (1998).

Videum Conference Pro (PCI) Specification, product of Winnov (Winnov), published Jul. 21, 1999.

Hoppe, Hugues, "Optimization of Mesh Locality for Transparent Vertex Caching," Proceedings of SIGGRAPH, pp. 269-276 (Aug. 8-13, 1999).

Whitepaper: Implementing Fog in Direct3D, Jan. 3, 2000, www.nvidia.com.

Akeley, Kurt, "Reality Engine Graphics", 1993, Silicon Graphics Computer Systems, pp. 109-116.

Kram et al., Thesis entitled "Multiple Camera Considerations in a View-Dependent Continuous Level of Detail Algorithm" (Mar. 2002).

Photograph of Sony PlayStation II System.

Photograph of Sega Dreamcast System.

Photograph of Nintendo 64 System.

Whitepaper: 3D Graphics Demystified, Nov. 11, 1999, www.nvidia.com.

Whitepaper: "Z Buffering, Interpolation and More W-Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirextX6", Game Developer, Sep. 1998, www.gdmag.com.

VisionTek, "GeForce2 GS Graphics Processing Unit", © 2000 www.visiontek.com.

Jim Bushnell et al, "Advanced Multitexture Effects With Direct3D and OpenGL", Pyramid Peak Design & ATI Research, Inc., Game Developers Conference, © 1999.

Sony PlayStation II Instruction Manual, Sony Computer Entertainment Inc., © 2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

GDC 2000: Advanced OpenGL Game Development, "A Practical and Robust Bump-mapping Technique for Today's GPUs," by Mark Kilgard, Jul. 5, 2000, www.nvidia.com.

Technical Presentations: "Texture Space Bump Mapping," Sim Dietrich, Nov. 10, 2000, www.nvidia.com.

Whitepapers: "Texture Addressing, " Sim Dietrich, Jan. 6, 2000, www.nvidia.com.

ZDNet Reviews, from PC Magazine, "Other Enhancements," Jan. 15, 1999, wysiwyg://16/http://www4.zdnet.com...ies/reviews/0,4161,2188286,00.html.

ZDNet Reviews, from PC Magazine, "Screen Shot of Alpha-channel Transparency," Jan. 15, 1999, wysiwyg://16/http://www4.zdnet.com...ies/reviews/0,4161,2188286,00.html.

Alpha (transparency) Effects, Future Technology Research Index, http://www.futuretech.vuurwerk.n1/alpha.html.

Blythe, David, 5.6 Transparency Mapping and Trimming with Alpha, http://toolbox.sgi.com/TasteOfDT/d...penGL/advanced98/notes/node41.html, Jun. 11, 1998.

10.2 Alpha Blending, http://www.sgi.com/software/opengl/advanced98/notes/node146.html.

10.3 Sorting, http://www.sgi.com/software/opengl/advanced98/notes/node147.html.

10.4 Using the Alpha Function, http://www.sgi.com/software/opengl/advanced98/notes/node148.html.

Winner, Stephanie, et al., "Hardware Accelerated Rendering Of Antialiasing Using A Modified A-buffer Algorithm," Computer Graphics Proceedings, Annual Conference Series, 1997, pp. 307-316.

White paper, Huddy, Richard, "The Efficient Use of Vertex Buffers," (Nov. 1, 2000).

White paper, Spitzer, John, et al., "Using GL_NV_array_range and GL_NV_Fence on GEForce Products and Beyond" (Aug. 1, 2000).

White paper, Rogers, Douglas H., "Optimizing Direct3D for the GeForce 256" (Jan. 3, 2000).

White paper, "Technical Brief, AGP 4X With Fast Writes—A Unique NVIDIA GeForce 256 Feature" (Nov. 10, 1999).

Hook, Brian, "An Incomplete Guide to Programming DirectDraw and Direct3D Immediate Mode (Release 0.46)," printed from web site: www.wksoftware.com, 42 pages.

Thompson, Tom, "Must-See 3-D Engines," BYTE Magazine, printed from web site www.byte.com, 10 pages (Jun. 1996).

Thompson, Nigel, "Rendering with Immediate Mode," Microsoft Interactive Developer Column: Fun and Games, printed from web site msdn.microsoft.com, 8 pages (Mar. 1997).

"HOWTO: Animate Textures in Direct3D Immediate Mode," printed from web site support.microsoft.com, 3 pages (last reviewed Dec. 15, 2000).

"INFO: Rendering a Triangle Using and Execute Buffer," printed from web site support.microsoft.com, 6 pages (last reviewed Oct. 20, 2000).

* cited by examiner

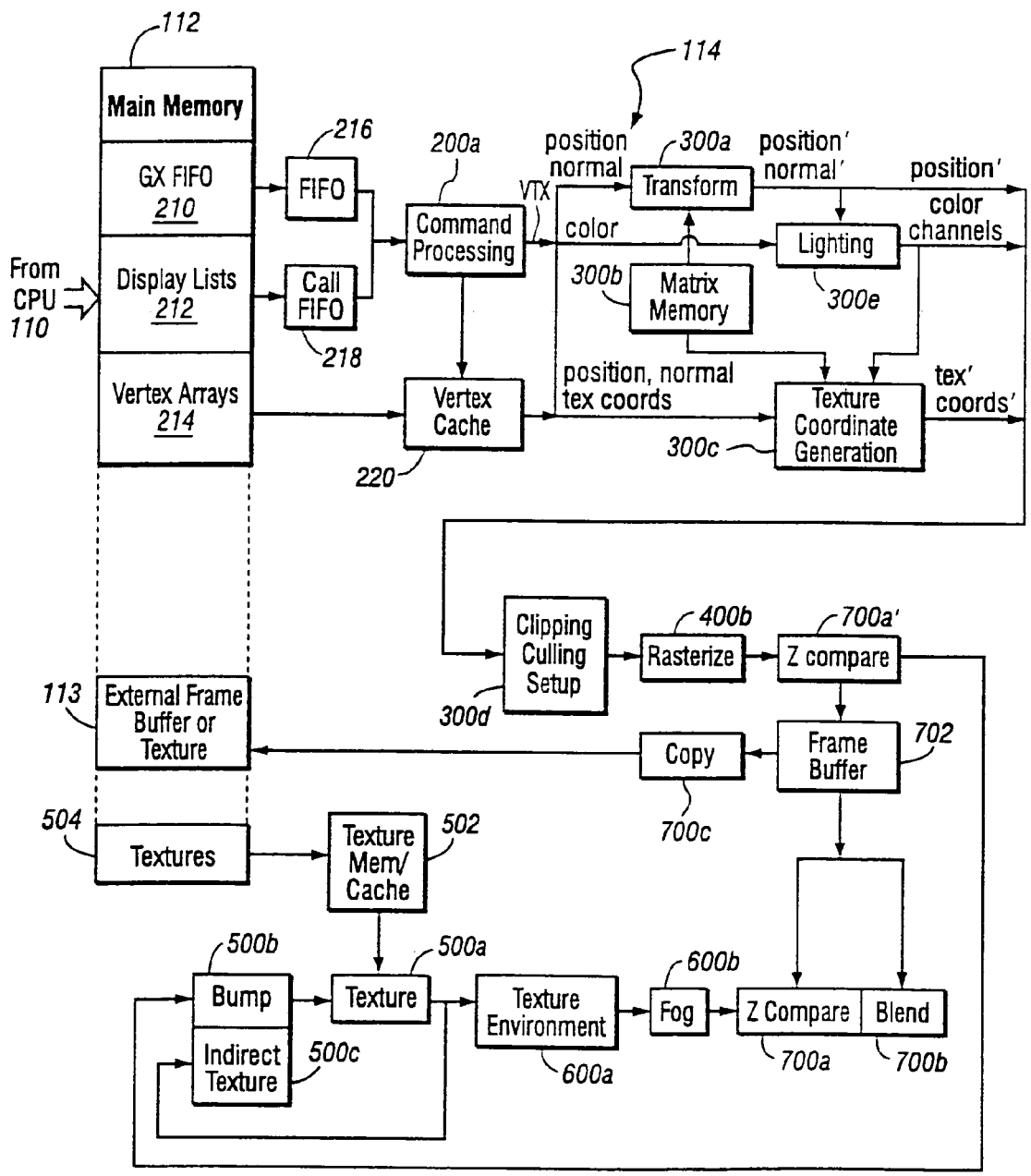
Fig. 5 EXAMPLE GRAPHICS PROCESSOR FLOW

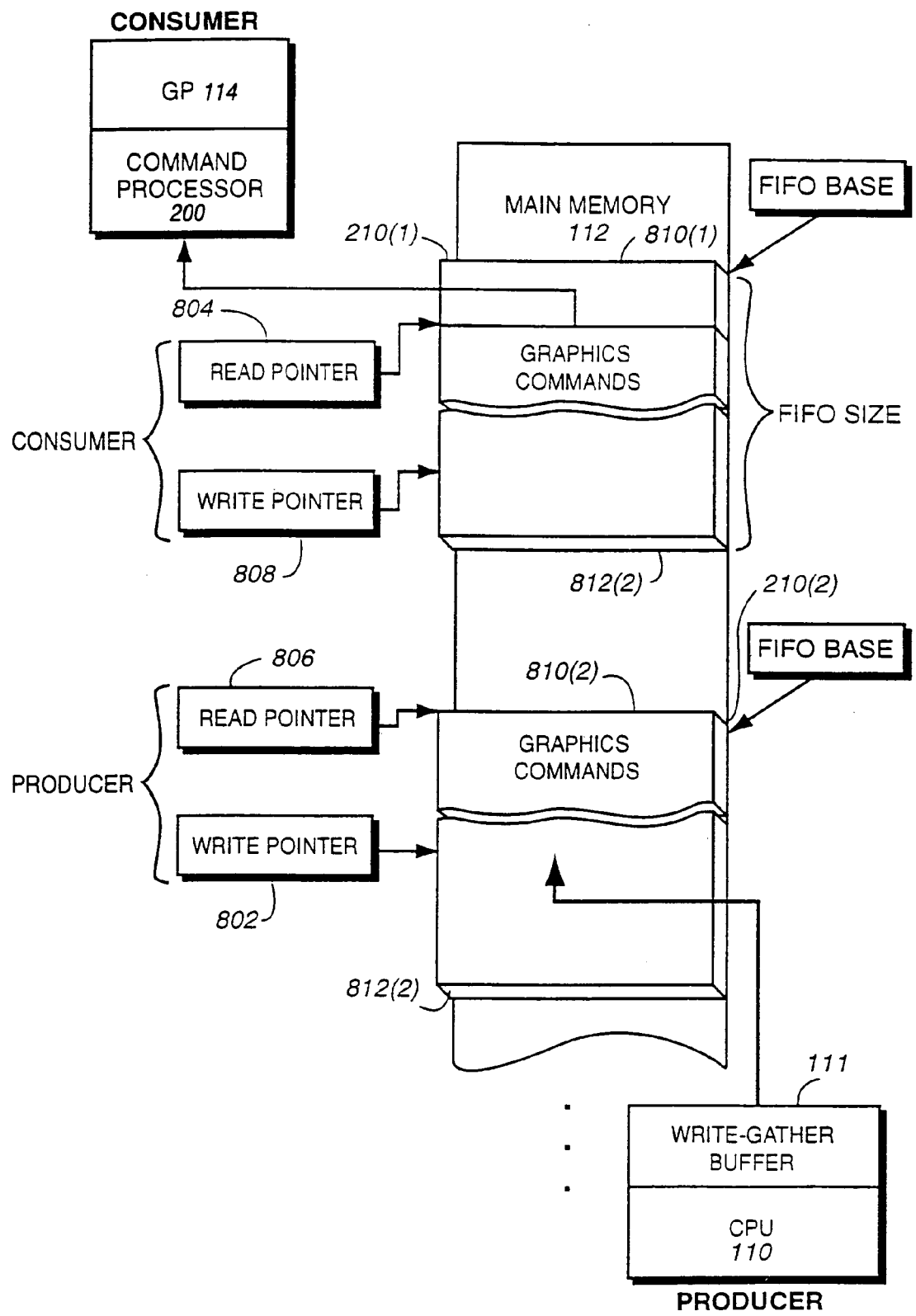
Fig. 6  EXAMPLE MULTI - BUFFERING

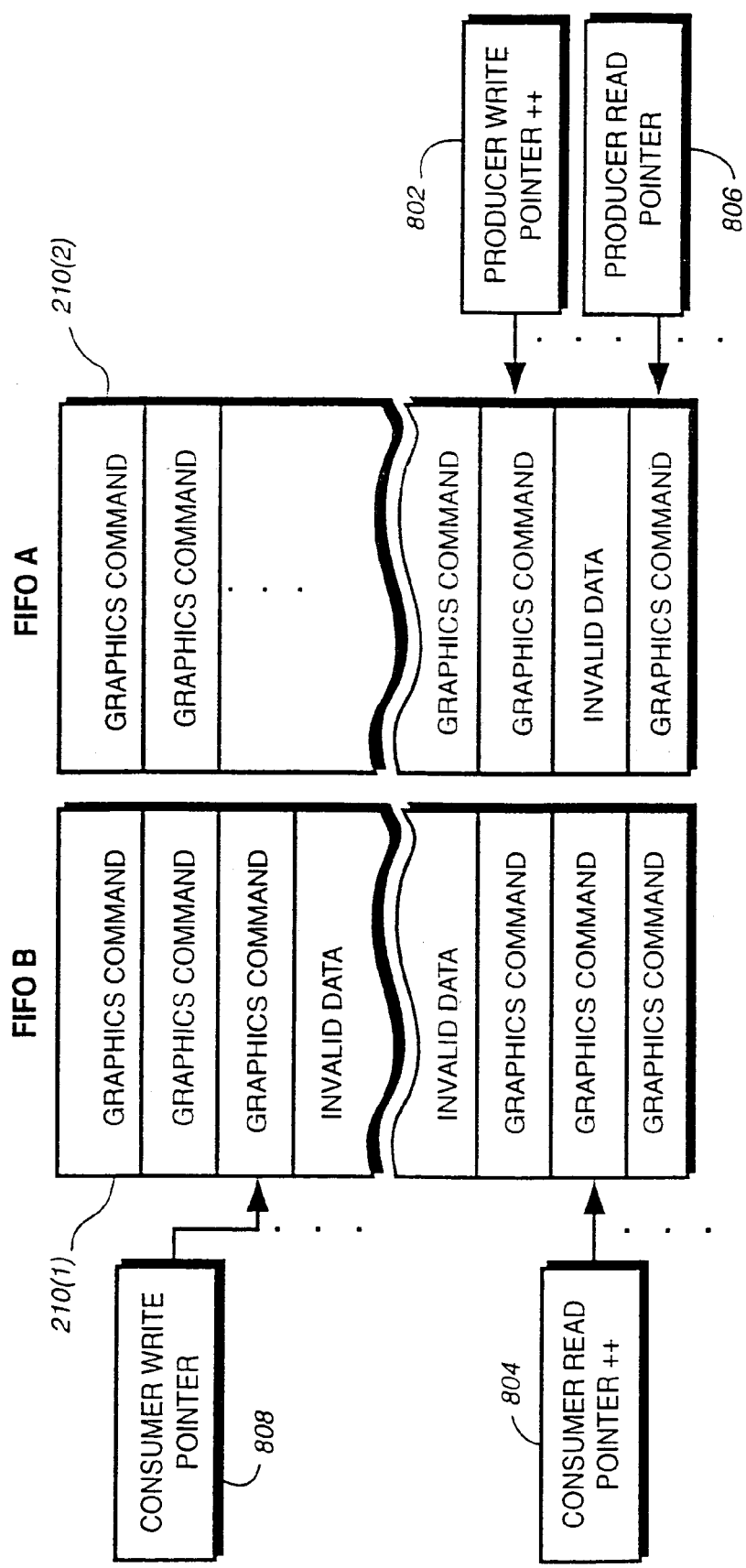
Fig. 7  EXAMPLE INDEPENDENT CONSUMER AND PRODUCER READ AND WRITE POINTERS

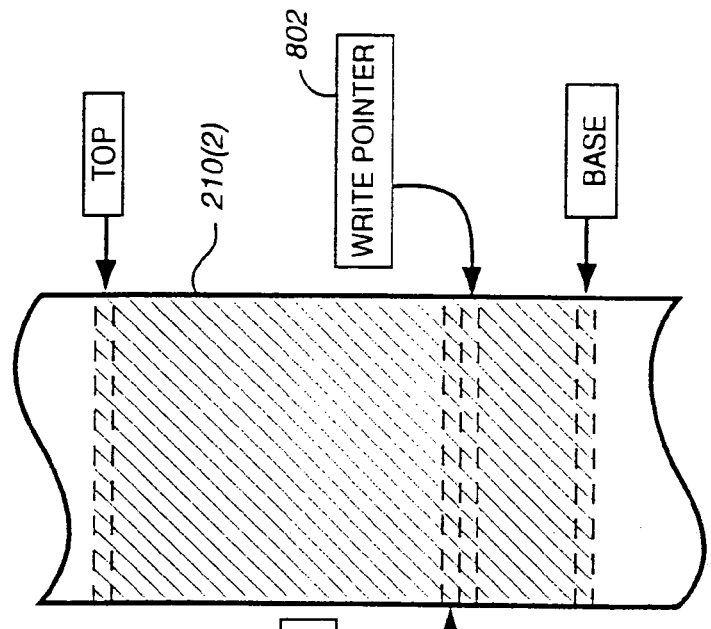
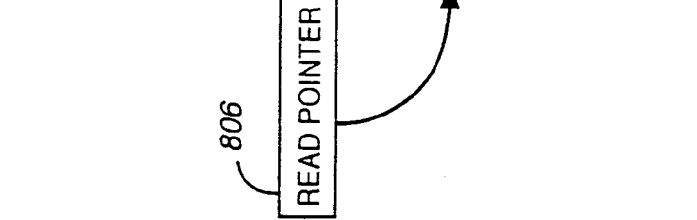
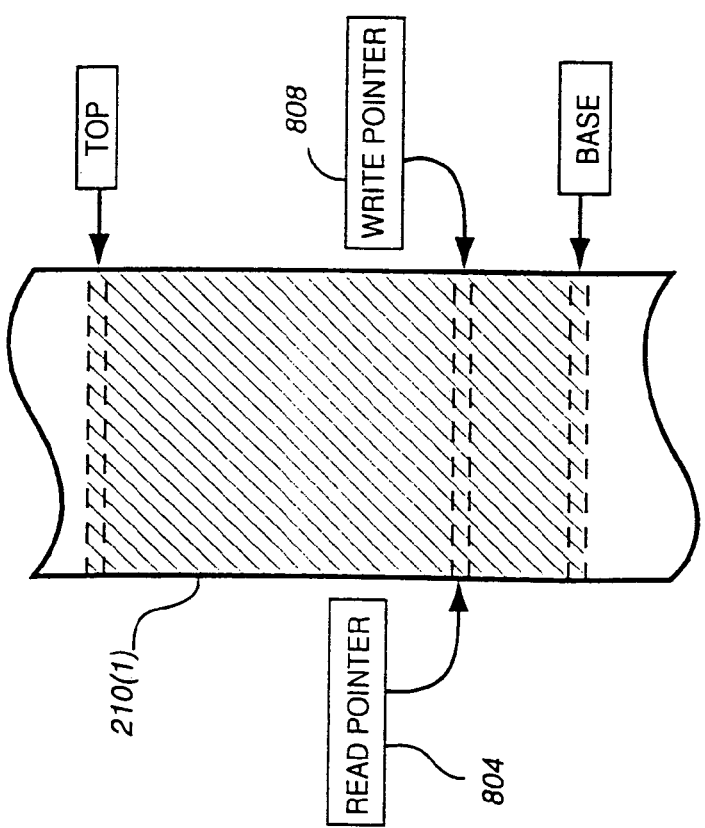
Fig. 8B FULL CONDITION
Fig. 8A EMPTY CONDITION

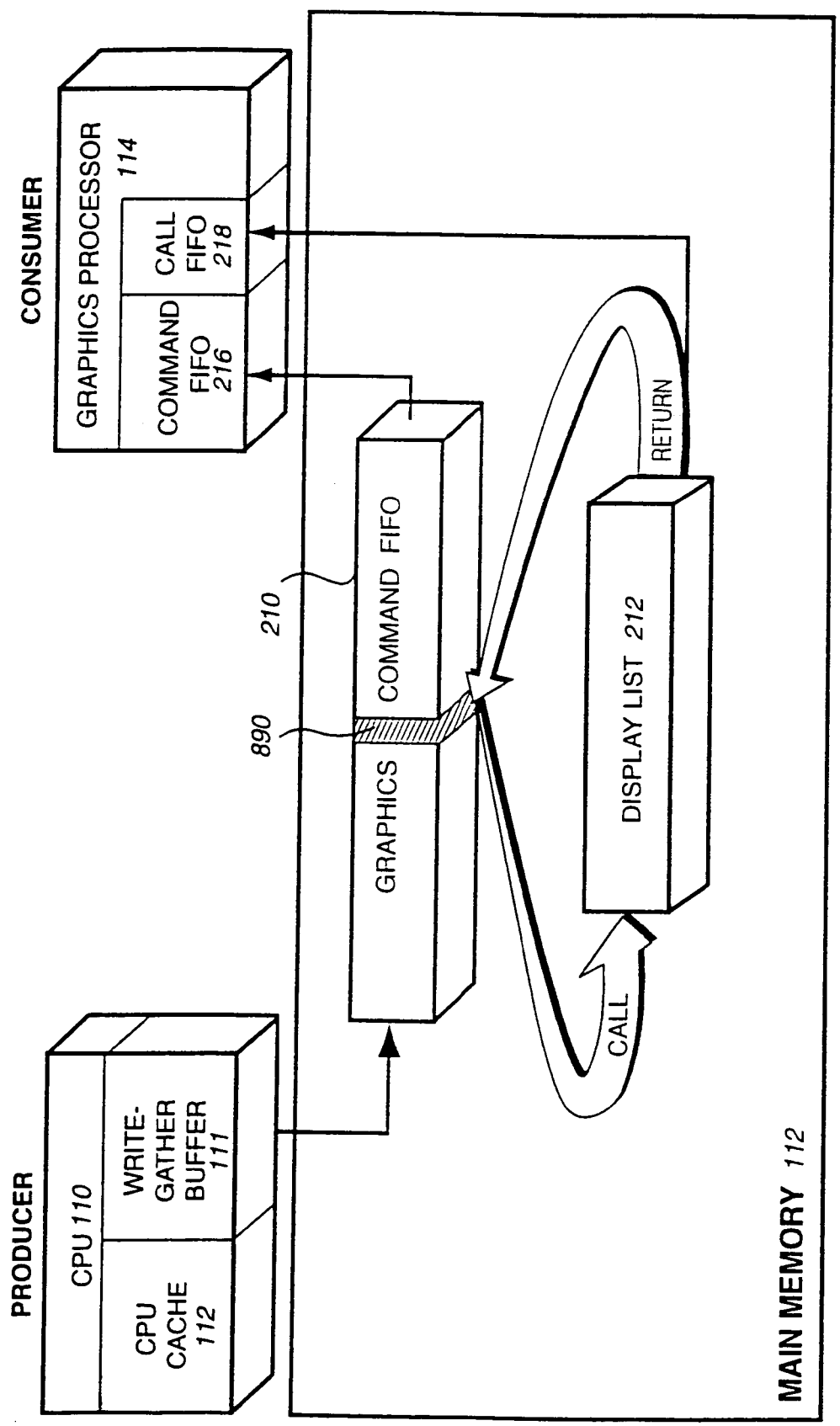
Fig. 9 EXAMPLE DISPLAY LIST CALL FROM COMMAND FIFO

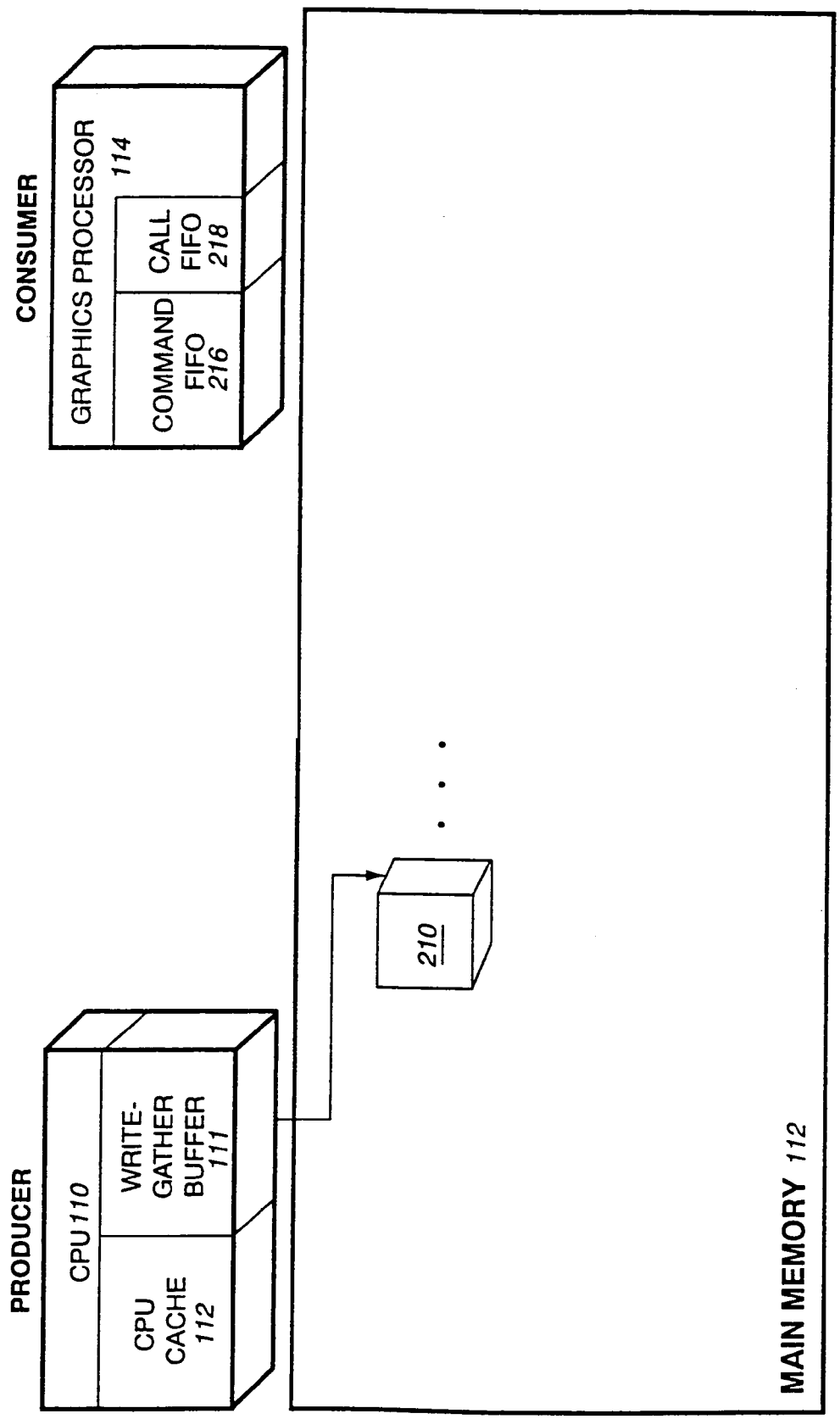
Fig. 10A  EXAMPLE WRITE TO FIFO BUFFER

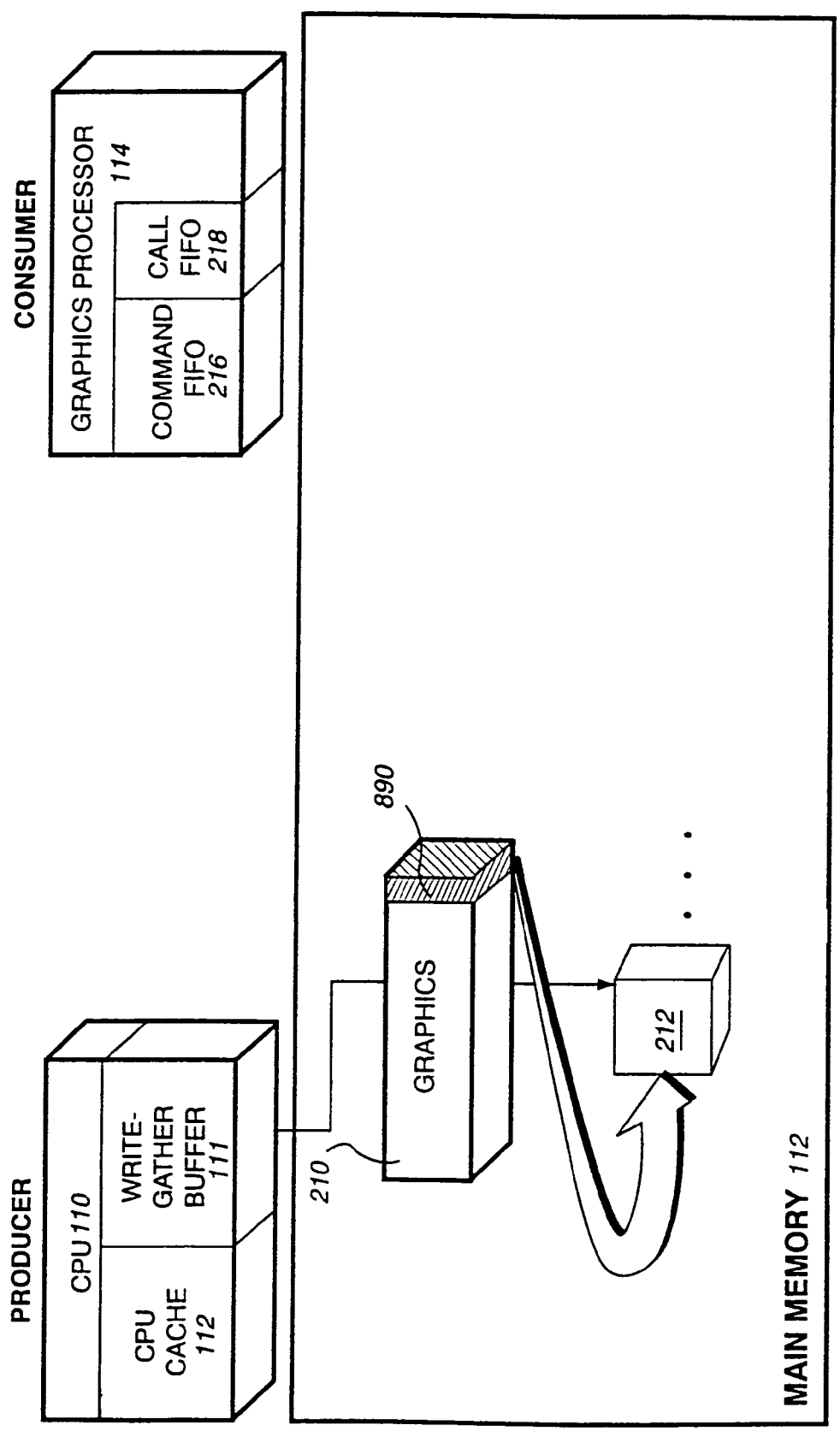
Fig. 10B EXAMPLE BEGIN DISPLAY LIST COMMAND

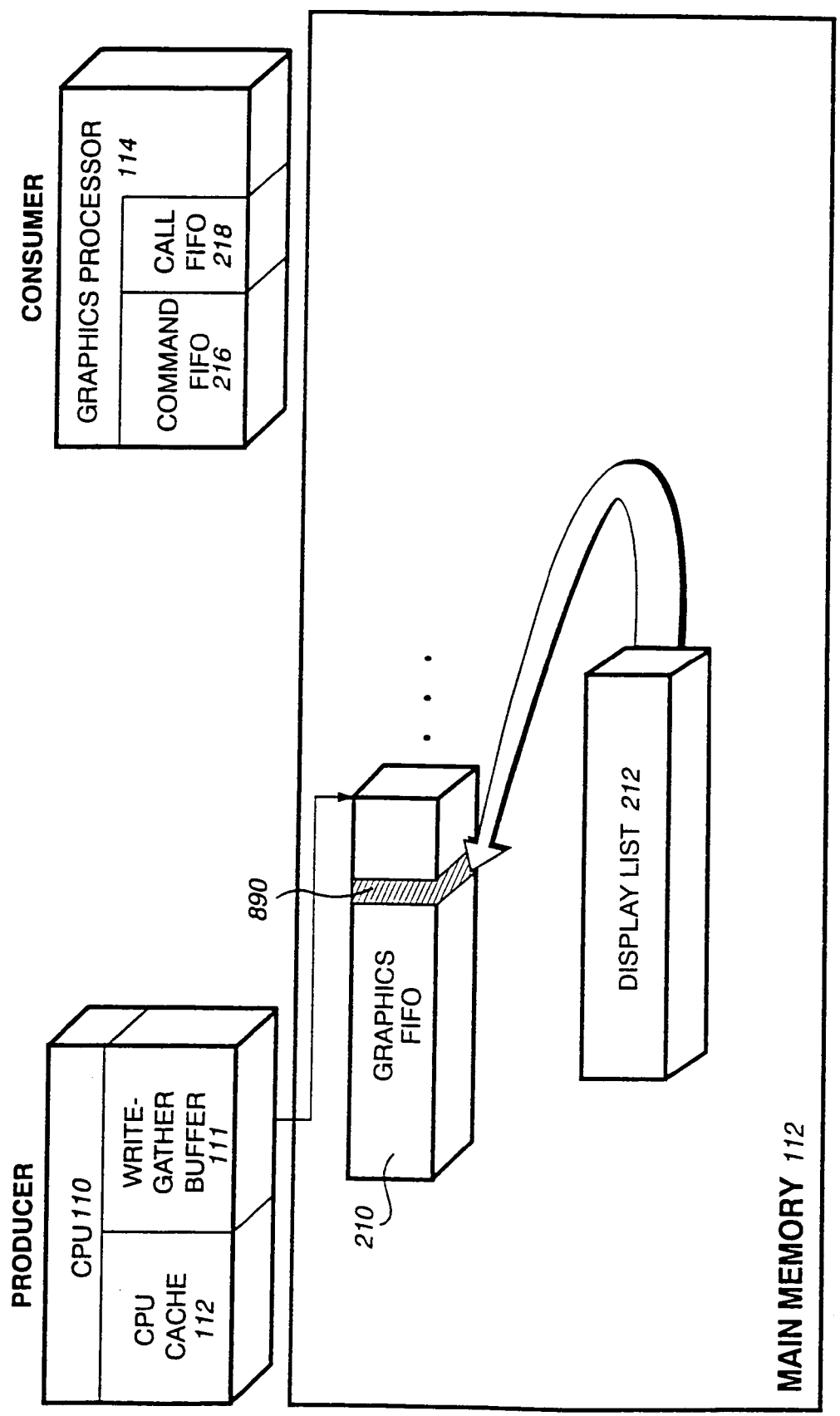
Fig. 10C  EXAMPLE END DISPLAY LIST COMMAND

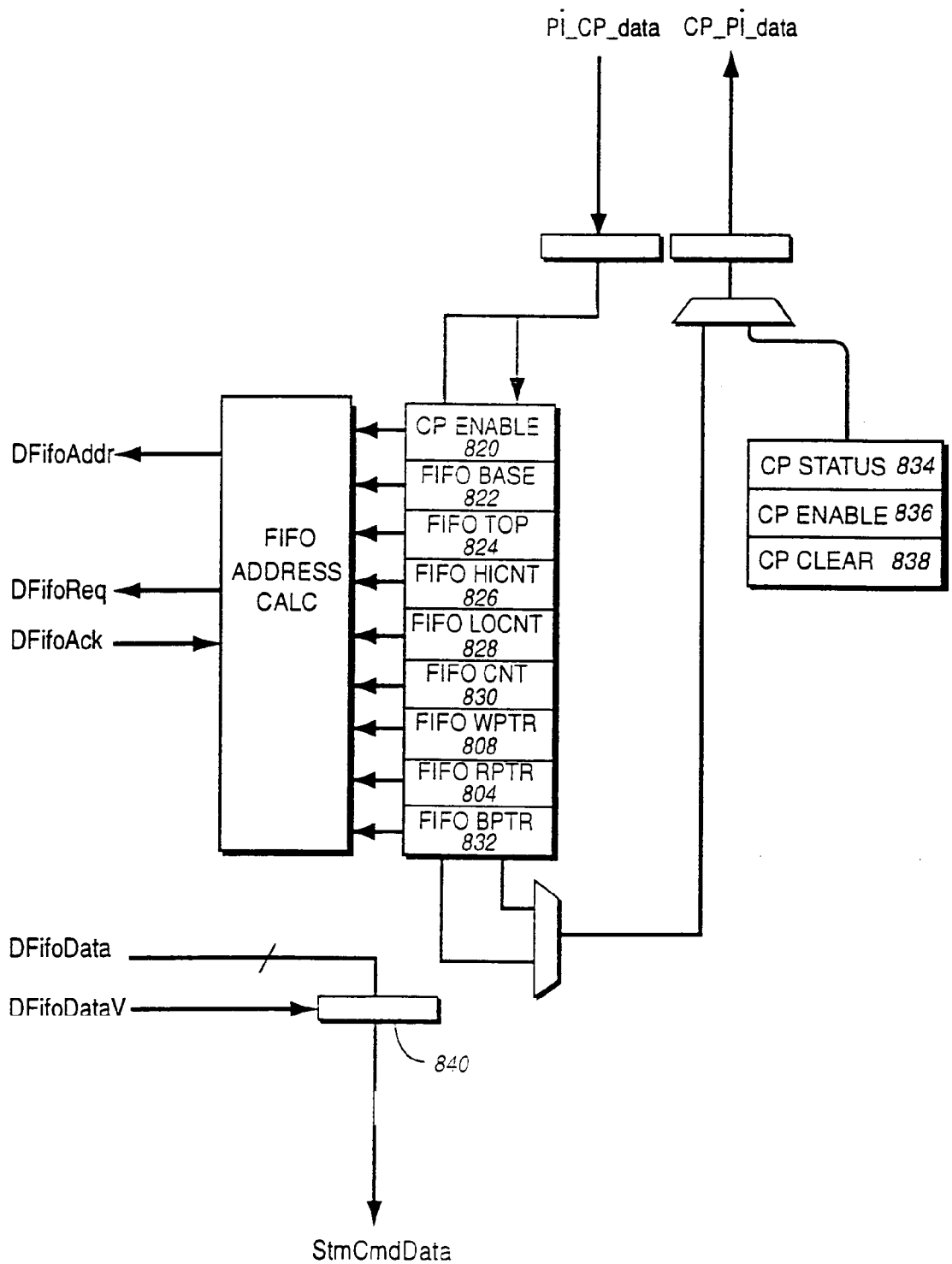
Fig. 11 EXAMPLE FIFO MANAGER

METHOD AND APPARATUS FOR BUFFERING GRAPHICS DATA IN A GRAPHICS SYSTEM

This application claims the benefit of U.S. Provisional Application No. 60/226,912, filed Aug. 23, 2000, the entire content of which is hereby incorporated by reference in this application.

FIELD OF THE INVENTION

The invention relates to computer graphics, and more particularly to interactive graphics systems such as home video game platforms. Still more particularly, this invention relates to efficient graphics command buffering between a graphics command producer and a graphics command consumer.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to efficiently buffer graphics commands between a graphics command producer and a graphics command consumer. Various solutions to this problem were offered. For example, it is well known to provide a buffer memory between a graphics command producer and a graphics command consumer. Often, this buffer memory is connected as part of the graphics command consumer (for example, on board a graphics chip). The graphics command producer writes graphics commands into the buffer memory, and the graphics command consumer reads those graphics commands from the buffer memory. It is typical for such a buffer memory to be structured as a first-in-first-out (FIFO) buffer so that the graphics command consumer reads the graphics command in the same sequence that they were written into the buffer by the graphics command producer.

Placing such a buffer between the producer and the consumer relaxes the degree to which the producer and consumer must be synchronized. The producer can write commands into the buffer at an instantaneous rate that is independent of the instantaneous rate at which the consumer reads commands from the buffer. Even if the consumer suffers a momentary delay in reading from the buffer (e.g., as may occur when the producer asks the consumer to draw large or complex primitives), the producer will not stall unless/until it fills the buffer and has no more memory space to write new commands. Similarly, momentary delays of the producer in writing new graphics commands into the buffer will not cause the consumer to stall unless the consumer consumes all of the graphics commands in the buffer before the producer has an opportunity to write additional graphics commands.

A potential problem encountered in the past relates to the size of the buffer. Because of limitations on chip size and complexity, it is often not possible to put a very large command buffer memory on the graphics chip. A small sized FIFO buffer in the graphics hardware may not adequately load balance between the producer and the consumer, causing the producer to stall when the consumer renders big primitives. Thus, while significant work has been done in the past, further improvements are possible.

The present invention solves this problem by providing techniques and arrangements that more efficiently buffer graphics commands between a graphics command producer and a graphics command consumer. In accordance with one aspect of the invention, a part of main memory shared between the producer and consumer is allocated to a variable number of variable sized graphics command buffers. The producer can specify the number of buffers and the size of each. Writes to the graphics consumer can be routed to any of the buffers in main memory. A buffer can be attached simultaneously to the consumer and the producer, or different buffers can be attached to the consumer and the producer. In the multi-buffering approach where different buffers are attached to the consumer and the producer, the producer can write to one buffer while the consumer reads from another buffer.

To further decouple the consumer from the producer, the producer and consumer independently maintain their own read and write pointers in accordance with another aspect of the invention. Even though the consumer may not write to the buffer, it nevertheless maintains a write pointer which it uses to keep track of data valid position within the buffer. Similarly, even though the producer may not read from the buffer it is attached to, it maintains a read pointer which it uses to keep track of data valid position within the buffer. The effect of this pointer arrangement is to further decouple the producer from the consumer—reducing the synchronization requirements between the two.

In accordance with another aspect provided by this invention, the producer can write a "call display list" command to a FIFO buffer that directs the consumer to read a string of graphics commands (e.g., a display list) stored elsewhere in memory, and to subsequently return to reading the rest of the buffer. This ability to call an out-of-line graphics command string from a FIFO buffer provides additional flexibility and further decreases synchronization requirements.

In accordance with another aspect of the invention, the graphics command producer can write a graphics command stream to a FIFO buffer that includes a command which automatically redirects succeeding commands to a display list buffer. One way to visualize this is to picture the graphics command producer as a redirectable fire hose that continually produces a stream of graphics commands. The fire hose normal streams the graphics command into a FIFO buffer. However, the producer can include, within the stream, a "Begin Display List" command that causes graphics commands following the command to be written to a display list instead. An "End Display List" command inserted further on in the stream can terminate the display list and redirect the graphics command stream back to the same (or different) FIFO buffer. This feature has the advantage of allowing the graphics command producer to efficiently create reusable display lists with very low overhead.

In accordance with another aspect provided by this invention, the graphics command producer can insert a break point into any of multiple FIFO buffers. The break point can cause the consumer to interrupt. Such break points can help to synchronize the producer and the consumer when close synchronization is required.

In accordance with yet another aspect provided by this invention, the graphics system includes a producer that outputs graphics commands, a consumer that consumes the graphics commands outputted by the producer, and a storage device coupled between the producer and the consumer. The storage device stores plural variable sized buffers disposed at variable locations within the storage device. Each of the variable sized buffers receives and temporarily stores graphics commands outputted by the producer for delivery to the consumer.

In accordance with a further aspect provided by the invention, the consumer is incapable of writing to at least an active one of the plural buffers, but nevertheless maintains—independently of the producer—a write pointer for at least the active one of the plural buffers. The producer provides a producer read pointer and a producer write pointer associated with a first of the plural buffers, and the consumer independently maintains a consumer read pointer and a consumer write pointer associated with that same buffer. The consumer may increment the consumer read pointer as the consumer reads from an active buffer and suspends reading from the active buffer when the incremented consumer read pointer has a predetermined relationship with a consumer write pointer. The consumer may selectively increment the consumer write pointer in response to the producer writing to the active buffer.

In accordance with another aspect of the invention, a buffer includes a read command that controls the consumer to consume a set of graphics commands the producer stores elsewhere within the storage device, and to resume consuming graphics commands from the buffer after consuming the graphics commands stored elsewhere. The read command may specify a starting address and a length of a display list. The read command controls the consumer to read the display list of the specified length beginning at the specified starting address.

In accordance with another aspect of the invention, any of the plural buffers may provide either circular or linear first-in-first-out access.

In accordance with another aspect of the invention, any of the plural buffers can be selectively attached to both the producer and the consumer simultaneously—or one of the buffers can be attached to the producer while another buffer is attached to the consumer.

In accordance with still another aspect provided by the invention, the producer allocates the size of each of the plural buffers. Such allocation is provided so that each buffer is capable of storing at least a frame of graphics commands.

In accordance with another aspect of the invention, the producer may write a break point into any of the plural buffers. The consumer may suspend consumption of graphics commands upon encountering the break point.

In accordance with yet another aspect of the invention, each buffer may provide an overflow status indicator indicating when the producer overwrites a location in the buffer.

In accordance with yet another aspect of the invention, a status register or other indicator may indicate the status of at least one of the plural buffers. The status register may indicate, for example:
producer writer pointer position,
producer read pointer position,
consumer write pointer position, and
consumer read pointer position.

In accordance with yet another aspect provided by this invention, a graphics system includes:
a storage buffer that receives and temporarily stores graphics commands,
a producer that writes graphics commands into the buffer, the producer maintaining a producer write pointer and a producer read pointer associated with the buffer, and
a consumer that consumes graphics commands stored within the buffer, the consumer maintaining a consumer write pointer that is independent of the producer write pointer and a consumer read pointer that is independent of the producer read pointer.

In accordance with yet another aspect of this invention, a graphics system includes a graphics command producer that writes graphics commands into a buffer based on a producer write pointer, and a graphics commands consumer that reads graphics commands from the buffer based on a consumer read pointer. In accordance with this aspect of the invention, the consumer write pointer is independently maintained by the consumer and indicates the extent of valid data the producer has written into the buffer. The consumer ceases to consume graphics commands from the buffer upon the consumer read pointer having a predetermined relationship to the consumer write pointer.

In accordance with yet another aspect provided by this invention, an interactive graphics system includes a processor module executing an application, a graphics processor module, and at least one memory coupled to the processor module and to the graphics processor module. The method of controlling the flow of graphics commands between the processor module and the graphics processor module comprises:
dynamically establishing, under control of the application, a variable number of FIFO buffers in the memory, the application specifying the size of each of the FIFO buffers,
the application controlling the processor module to write graphics commands into at least a first of the plurality of FIFO buffers, and
the application sending graphics commands to the graphics processor module that control the graphics processor module to read graphics commands from the first FIFO buffer.

The processor module may provide a processor module read pointer and processor module write pointer associated with the first of plurality of buffers. The graphics processor module may independently maintain a graphics processor module read pointer and a graphics processor module write pointer associated with the first buffer. The graphics processor module may increment the graphics processor read pointer each time the graphics processor module reads from the first buffer, and may suspend reading from the first buffer when the graphics processor module read pointer has a predetermined relationship with the graphics processor module write pointer. Graphics processor module may selectively auto increment the graphics processor write pointer in response to the processor writing to the first buffer.

In accordance with yet another aspect of the invention, a method of controlling the flow of graphics data comprises:
  writing graphics data into plural variable sized FIFO buffers each having plural storage locations,
  setting a break point associated with at least one of the plural storage locations,
  reading graphics data from the plural buffers in a predetermined order,
  temporarily suspending the reading step upon encountering the at least one location associated with the break point, and generating an interrupt, and
  resuming the reading step in response to receipt of a clear interrupt command.

In accordance with yet another aspect provided by this invention, a graphics system includes:
  a storage device that receives and temporarily stores graphics commands,
  a producer that writes commands into a buffer within the storage device, the commands including a first set of graphics commands and a read command referring to a second set of graphics commands stored elsewhere in the storage device, and
  a consumer that consumes the first set of graphics commands stored within the buffer and, in response to encountering the read command, consumes the second set of graphics commands and subsequently consumes additional commands from the buffer.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 6 shows example multi-buffering;

FIG. 7 shows example independent consumer and producer read and write pointers;

FIGS. 8A and 8B show, respectively, example empty and full buffer conditions;

FIG. 9 shows an example call of a display list from an FIFO buffer;

FIGS. 10A–10C show example display list creation; and

FIG. 11 shows an example FIFO manager implementation; and

DETAILED DESCRIPTION OF EXAMPLE EMBODIMENTS OF THE INVENTION

Figure 1:
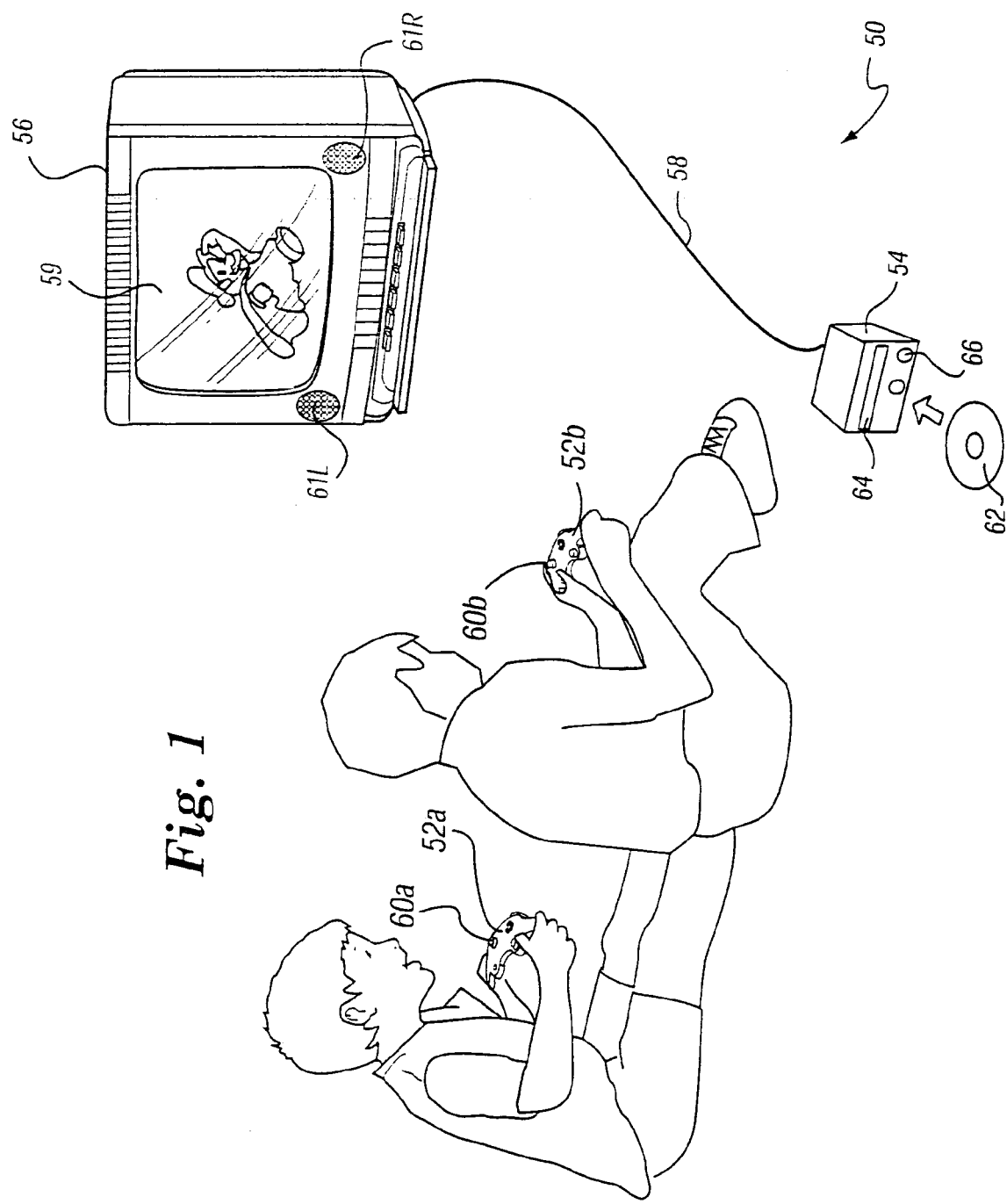
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g.,. 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
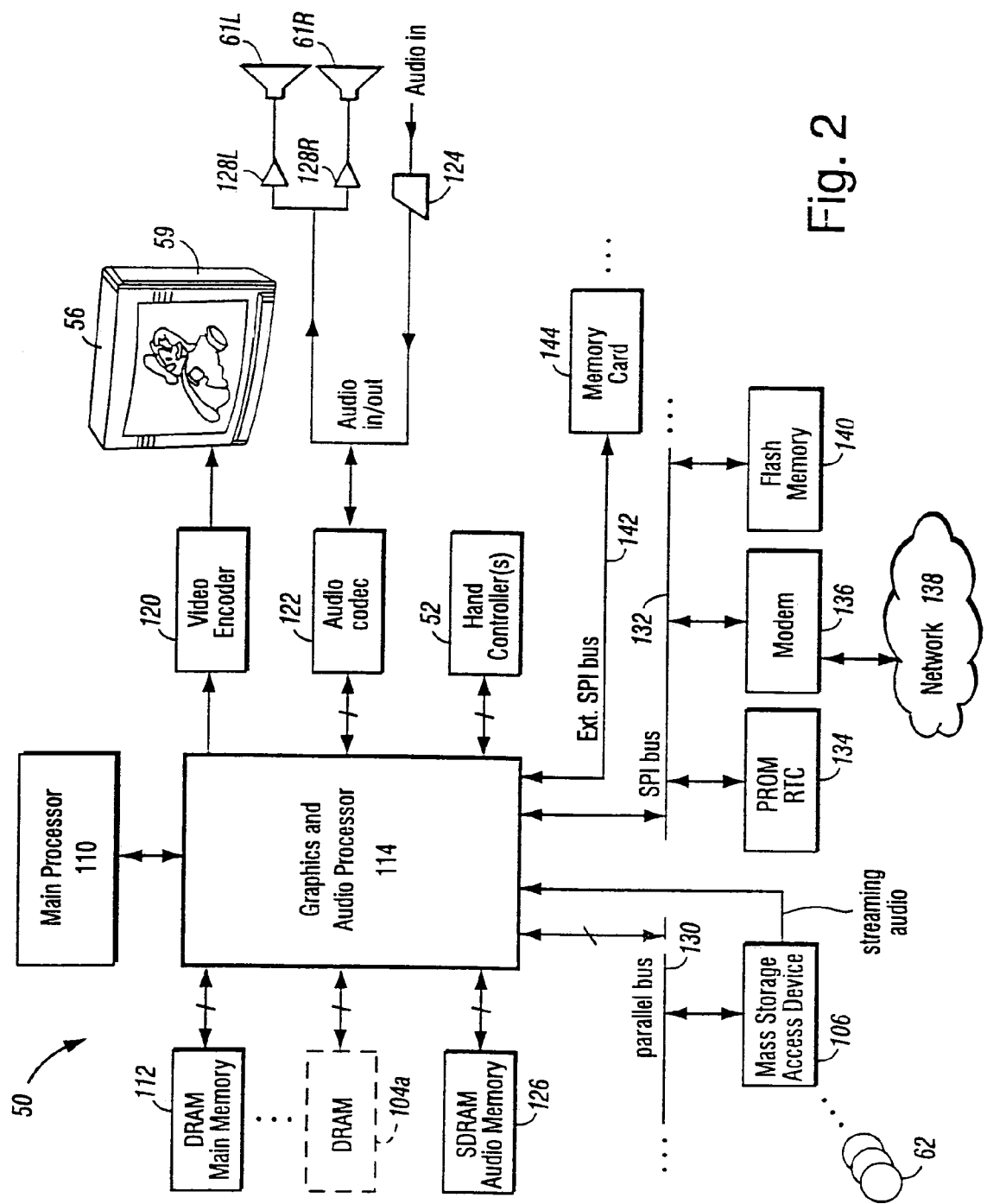
FIG. 2 is a block diagram of the FIG. 1 example computer graphics system.

FIG. 2 shows a block diagram of example components of system 50. The primary components include:
  a main processor (CPU) 110,
  a main memory 112, and
  a graphics and audio processor 114.

In this example, main processor 110 (e.g., an enhanced IBM Power PC 750) to receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:
  a programmable read-only memory and/or real time clock 134,
  a modem 136 or other networking interface (which may in turn connect system 50 to a telecommunications network 138 such as the Internet or other digital network from/to which program instructions and/or data can be downloaded or uploaded), and
  flash memory 140.

A further external serial bus 142 may be used to communicate with additional expansion memory 144 (e.g., a memory card) or other devices. Connectors may be used to connect various devices to busses 130, 132, 142.

Example Graphics And Audio Processor

Figure 3:
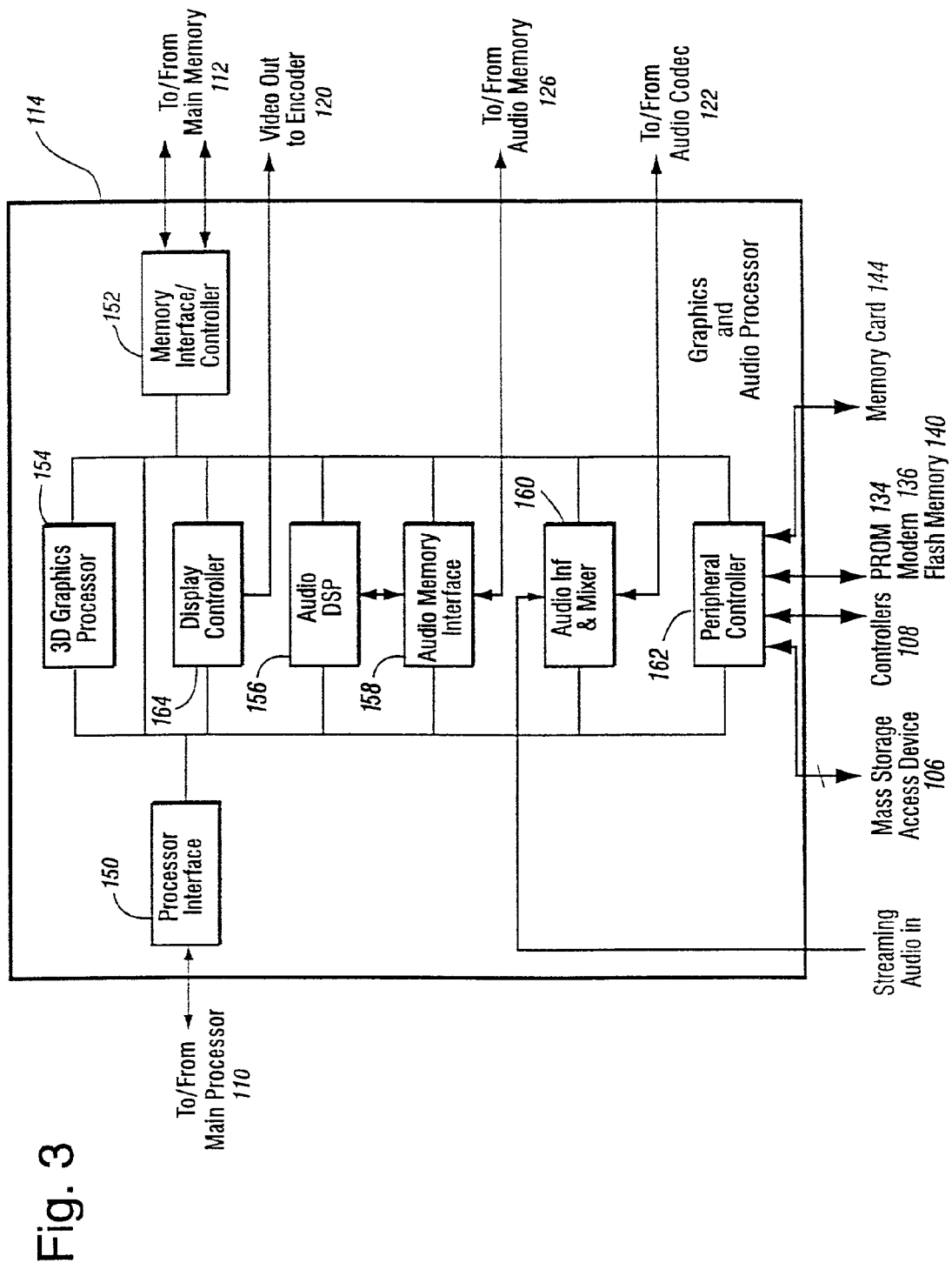
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:
  a processor interface 150,
  a memory interface/controller 152,
  a 3D graphics processor 154,
  an audio digital signal processor (DSP) 156,
  an audio memory interface 158,
  an audio interface and mixer 160,
  a peripheral controller 162, and
  a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
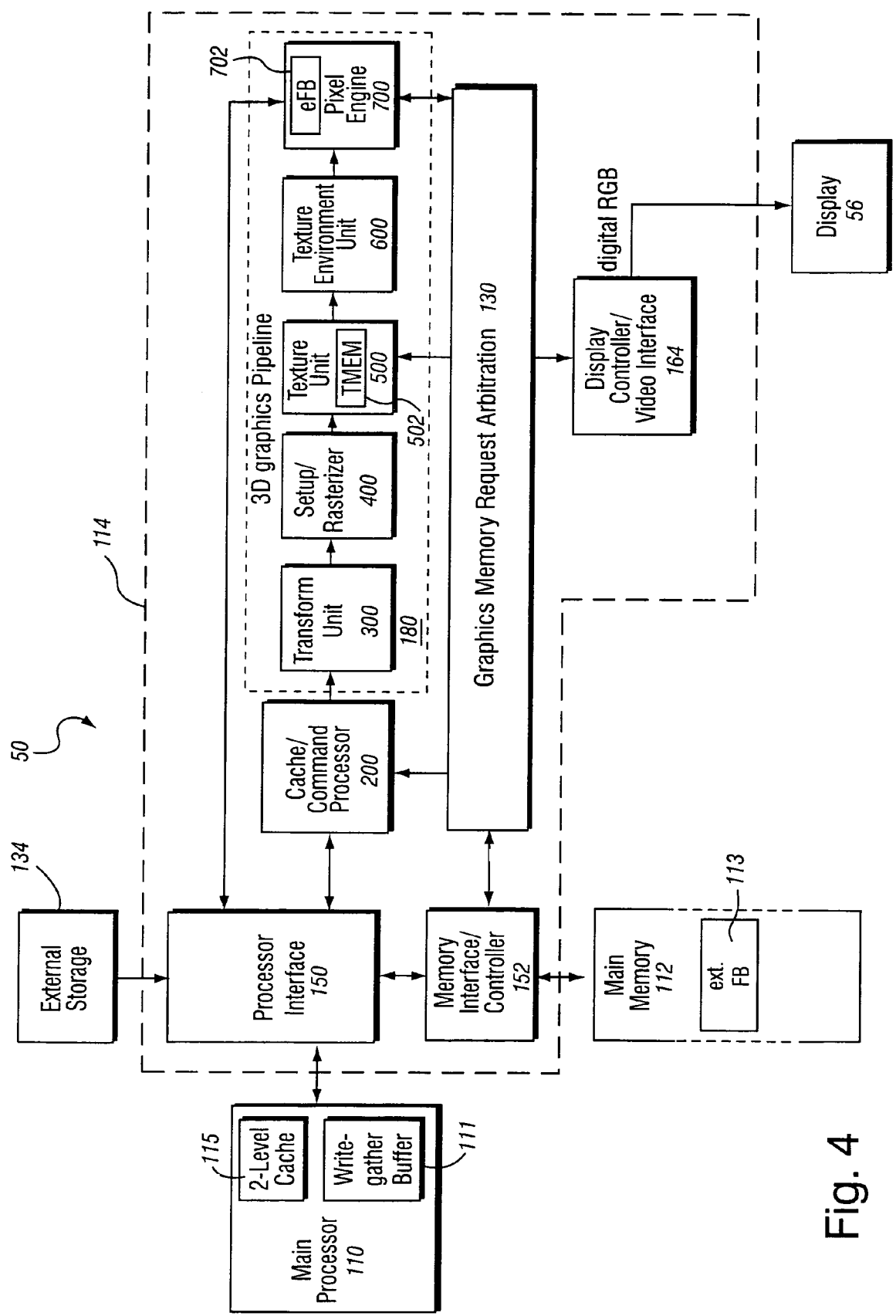
FIG. 4 is a block diagram of the example 3D graphics processor shown in is FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 10 stores graphics commands in one or more graphics first-in-first-out (FIFO) buffers 210 it allocates in main memory 110. The command processor 200 fetches:
  command streams from main memory 112 via an on-chip FIFO memory buffer 216 that receives and buffers the graphics commands for synchronization/flow control and load balancing,
  display lists 212 from main memory 112 via an on-chip call FIFO memory buffer 218, and
  vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:
a transform unit 300,
a setup/rasterizer 400,
a texture unit 500,
a texture environment unit 600, and
a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
retrieving textures 504 from main memory 112,
texture processing (500a) including, for example, multi-texture handling, post-cache texture decompression, texture filtering, embossing, shadows and lighting through the use of projective textures, and BLIT with alpha transparency and depth,
bump map processing for computing texture coordinate displacements for bump mapping, pseudo texture and texture tiling effects (500b), and
indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

FIFO Buffers Allocated in Shared Memory

In this example, the command FIFO buffer 216 (which may be a small dual ported RAM streaming buffer) on board the graphics and audio processor 114 is too small, by itself, to do a good job of load balancing between the processor 110 and the graphics pipeline 180. This may result in the processor 110 becoming stalled when the graphics and audio processor 114 is rendering big primitives. To remedy this problem, we use part of the main memory 112 shared between processor 110 and graphics and audio processor 114 as a command FIFO buffer 210. The use of buffers 210 allows the main processor 110 and the graphics processor 114 to operate in parallel at close to their peak rates.

There are (at least) two methods of using buffers 210 to achieve parallelism: immediate mode and multi-buffer mode. When a single buffer 210 is attached to both the main processor 110 and the graphics processor 114, the system 50 is operating in the immediate mode. As the main processor 110 writes graphics commands to the buffer 210, the graphics processor 114 processes them in order. Hardware support provides flow control logic to prevent writes from overrunning reads and to wrap the read and write pointers of the buffer 210 back to the first address to provide circular buffer operation.

In the preferred embodiment, it is also possible to connect one buffer 210 to the main processor 110 while the graphics and audio processor 114 is reading from a different buffer 210(1) in a multi-buffered mode. In this case, the buffers 210(1), 210(2) are managed more like buffers than traditional FIFOs since there are no simultaneous reads and writes to any particular buffer 210. Multi-buffer mode may be used, for example, if dynamic memory management of the buffers is desirable.

FIG. 6 shows how a portion of shared memory 112 can be allocated to provide multiple FIFO command buffers 210(1), 210(2), . . . , 210(n) to buffer graphics (and audio) commands between the producer 110 and the consumer 114. In the example shown in FIG. 6, each of buffers 210 receives graphics (and/or audio) commands from main processor 110, and provides those commands to graphics and audio processor 114. Main processor 110 allocates portions of main memory 112 for use as these buffers 210. A buffer data structure describing a region of main memory can be allocated by an application running on main processor 110.

Main processor 110 writes graphics commands into the buffers using a write pointer 802. Graphics and audio processor 114 reads commands from buffers 210 using a read pointer 804. Write pointer 802 and read pointer 804 can point to the same or different buffers. In this way, the same buffer 210 may be "attached" to both the main processor 110 and the graphics and audio processor 114 simultaneously—or different buffers may be attached to the producer and consumer at different times.

In the multi-buffering example shown in FIG. 6, the main processor 110 and the graphics and audio processor 114 don't necessarily agree on where "the" FIFO buffer 210 is located. In the example shown, the main processor 110 is using buffer 210(2) as its current buffer for writing graphics commands to, whereas the graphics and audio processor 114 uses a different buffer 210(1) as its current buffer for obtaining graphics commands. Buffers 210 can be dynamically attached to main processor 110, graphics and audio processor 114, or both. When a buffer is attached to the main processor 110, the main processor will write graphics commands into the buffer 210. In the example embodiment, there is always one and only one buffer 210 attached to main processor 110 at any one time. When a buffer 210 is attached to the graphics processor 114, the graphics processor will read and process graphics commands from the attached buffer 210. Only one buffer 210 can be attached to the graphics processor 114 at any one time in this example.

Independent Consumer and Producer Read and Write Pointers

Even though main processor 110 acting as graphics command producer does not need to read from the buffer 210(2) to which it is attached, it nevertheless maintains a producer read pointer 806 in this FIG. 6 example. Similarly, even though the graphics and audio processor 114 acts as a consumer of graphics commands and therefore does not need to write to the buffer 210(1) to which it is attached, it nevertheless maintains a consumer write pointer 808 in the FIG. 6 example. These additional pointers 806, 808 allow the producer and consumer to independently maintain the respective buffer 210 to which it is attached.

The additional pointer 806 maintained by main processor 110 and the additional pointer 808 maintained by graphics and audio processor 114 are used to provide overlap detection. These extra pointers indicate where valid data exists within the buffer 210. For example, the main processor 110 may treat the buffer 210(2) to which it is attached as a circular buffer, and "wrap" its write pointer around to the "beginning" of the buffer 810 once it reaches the "end" of the buffer 812. However, once the producer write pointer 802 encounters the producer read pointer 806, it will cease writing to attached buffer 210(2) to avoid overwriting valid, previously written data that the graphics and audio processor 114 has not yet read. Similarly, the graphics and audio processor consumer 114 may continue to increment its read pointer 804 as it progressively reads graphics instructions from its attached buffer 210(1), but will cease this incrementing procedure when the read pointer 804 encounters the write pointer 808—since the consumer is using the write pointer as indicating the last valid data within the buffer 210(1).

Pointers 802, 804, 806, and 808 can point to any location within buffers 210. Valid data may thus exist anywhere within these buffers—not necessarily at the beginning or at the end of the buffer. In fact, if buffers 210 are operated in a circular mode, there is no concept of "beginning" or "end" since the end of the buffer wraps around to the beginning and the buffer is therefore a logically continuous loop.

FIG. 7 provides a simplified explanation of the independent consumer and producer read and write pointers. In the FIG. 7 example, consumer 114 uses an auto-incrementing read pointer 804 to read graphics commands from the buffer 210(1) to which it is attached. Consumer 114 also maintains a consumer write pointer 808 that points to the last valid graphics command within buffer 210(1). In this example, consumer 114 will continue to read graphics commands from buffer 210(1), and increment its read pointer 804 after each graphics command read, until the read pointer points to the same location that the write pointer points to (see FIG. 8A). When the consumer 114 has incremented its read pointer 804 so that it points to the location adjacent the one that the write pointer 808 points to, the consumer "knows" that it has read all of the valid graphics commands from buffer 210(1) and has thus emptied the buffer. This condition indicates that the consumer 114 either needs to wait for more graphics commands from producer 110 (if the buffer 210(1) is also attached to the producer simultaneously), or it needs direction as to a different buffer 210 it should begin reading from (if multi-buffering is in effect).

Similarly, the producer 110 may continue to write graphics commands into its attached buffer 210(2) and similarly continues to auto-increment its producer write pointer 802 until the write pointer points to the location in the buffer that is just before the location the producer read pointer 806 points to (see FIG. 8B). In this example, coincidence (actually, close proximity) between the write pointer 802 and read pointer 806 indicates that the buffer 210(2) is full. If multi-buffering is in effect, producer 110 may at this point cease writing to buffer 210(2) and "save" (close) it, instruct the consumer 114 to read (now or later) the contents of that "closed" buffer, and begin writing additional graphics commands to yet another buffer 210 it can allocate within main memory 112. If the producer 110 and consumer 114 are attached to the same buffer 210, then the producer may need to wait until the consumer reads some commands before writing any more commands to the buffer. As explained below, to avoid frequent context switching, the preferred embodiment can provides a programmable hysteresis effect that requires the buffer to be emptied by a certain amount before the producer 110 is allowed to resume writing to the buffer, and requires the buffer to be filled by a certain amount before the consumer is allowed to resume reading from the buffer.

In the preferred embodiment, the main processor 110 writes graphics commands to the buffer 210 to which it is attached in 32-byte transfers. Main processor 110 provides a write-gathering buffer/function 111 (see FIG. 4) that automatically packs graphics commands into 32-byte words. Graphics processor 114 reads graphics commands from the buffer 210 to which it is attached in 32-byte transfers.

Call Display List from FIFO Buffer

FIG. 9 shows an example technique provided by the preferred example embodiment whereby an entry in a FIFO buffer 210 can call a display list—almost as if it were a function call. In this example, a command 890 is inserted into the graphics command FIFO 210 that calls a display list 212 stored elsewhere in memory. Upon encountering this command 890, the graphics processor 114 temporarily ceases reading graphics commands from FIFO buffer 210 and instead begins reading commands from a display list 212 stored elsewhere in main memory 112. Upon reaching the end of the display list 212, the graphics processor 114 returns to read the next sequential command from the graphics FIFO 210. This technique is quire useful in allowing multiple frames to call the same display list 212 (e.g., to render geometry which remains static from frame to frame) without requiring the main processor 112 to rewrite the display list for each frame.

FIGS. 10A through 10C show how main processor 110 can automatically create a display list 212 by writing to a graphics command FIFO 210. As shown in FIG. 10A, main processor 110 begins by writing a graphics command stream to a graphics command FIFO 210 it allocates in main memory 112. At any point in this writing process, the main processor 110 can insert a "Begin Display List" command 890 into the FIFO buffer 210 that causes further writes from the main processor to be directed to a display list 212. FIG. 10C shows that once main processor 110 is finished writing display list 212, it may issue an "End Display List" command that has the effect of automatically terminating the display list and redirecting the main processor command stream output back to FIFO buffer 210. One can visualize main processor 110 providing a redirectable "fire hose" command stream output that can gush graphics commands into FIFO buffer 210, display list 212, and back to the same or different FIFO buffer 212. The display lists 212 created in this manner can remain in memory 112 and reused for parts of images that remain static over several frames or frame portions.

Example Implementation Details

A processor to graphics interface unit portion 202 of the graphics and audio processor 114 command processor 200 contains the control logic for managing the FIFO buffers 210 in main memory 112. FIG. 11 shows an example implementation. In the example shown, all CPU, 110 writes to the graphics and audio processor 114 will be routed to the main memory 112. There are two registers that define the portion of the main memory 112 that has been allocated to the graphics FIFO 210 attached to the graphics and audio processor 114:

the FIFO BASE register 822, and
the FIFO TOP register 824.

The FIFO_BASE register 822 defines the base address of the FIFO 210. The FIFO_TOP register 824 defines the last address in the FIFO.

Command processor 200 keeps track of the read and write pointers for FIFO 210 in hardware. Since all data written into the FIFO are cache line sized, there is no need to keep track of valid bytes. The write pointer 808 is incremented by 32 bytes every a cache line is written to an address that is between FIFO_BASE and FIFO_TOP (5LSBs are 0). Reading of the FIFO 210 is also performed one cache line at a time. The read pointer is incremented by 32 after a cache line has been read.

Initially, read pointer 804 and write pointer 808 are initialized to point to the same location, which means the FIFO is empty (see FIG. 8A). The FIFO full condition is (read pointer—1)=(write pointer) (see FIG. 8B). Write pointer 808 wraps around to the FIFO_BASE 204(2) address after it reaches FIFO_TOP. The read pointer 804 also wraps around when it reaches FIFO_TOP 824. The read pointer 804 is controlled by the hardware to make sure it doesn't get ahead of the write pointer 808, even in the wrap around cases. The application running on processor 110 makes sure that the write pointer 808 doesn't surpass the read pointer 804 after wrapping around.

Data from two (or more) different frames can be resident in the same FIFO 210. A break point mechanism can be used to prevent the command processor 200 from executing the second frame before the first frame can be copied out of the embedded DRAM 702. When FIFO break point (register) 832 is enabled, command processor 200 will not read past the CP_FIFO_BRK register. The CPU 100 can program this register 832 at the end of a frame. CPU 110 has to flush the write-buffer on the graphics and audio processor 114 and then read the FIFO write pointer 808. It then writes the value into the FIFO break register 832 and enables the break point.

If the size of the FIFO 210 is big enough to hold all the data sent in one frame, then the FIFO full condition shown in FIG. 8B will never occur. However, this could mean allocating 2 to 4 Mbytes of main memory 112 for the FIFO buffer 210. Some application developers might not want to use that much memory for FIFO 210. In that case, the application should implement a flow control technique. Registers 826, 828 can be used to provide such flow control. Flow control is done in the example embodiment by having graphics and audio processor 114 generate an interrupt back to the CPU 110 when the number of cache lines in the main memory 110 surpasses FIFO_IHCNT 826. The processor 110 will take the interrupt and spin or do other non-graphical tasks, until the number of cache-lines in the FIFO is less than a FIFO_LOCNT 828. The reason for providing such a hysteresis effect is that interrupt overhead is high and one does not want to bounce in and out of the interrupt routine just by checking that the contents of the FIFO 210 has gone below the "high water mark". Interrupts can also be generated when the FIFO count goes below the LOCNT 828. This way, the application can perform other tasks and return when interrupted.

Example FIFO Buffer Allocation

In the preferred embodiment, the graphics API declares a static FXFifoObj structure internally. This structure is initialized when GXInit is called:

GXFifoObj* GXInit (void* base, u32 size);

The FIFO base pointer is aligned to 32b in the preferred embodiment. The application is responsible for allocating the memory for the FIFO. The size parameter for allocation is the size of the FIFO in bytes (the minimum FIFO size is 64 KB, and size is a multiple of 32B). By default, GXInit sets up the FIFO for immediate mode graphics; that is: both the CPU 10 and graphics processor 114 are attached to the FIFO, the read and write pointers are initialized to the base pointer, and high and low water marks are enabled. GXInit returns a pointer to the initialized GXFifoObj to the application.

If the application wants to operate in multi-buffered mode, then additional FIFOs must be allocated. Any number of such additional FIFO buffers 210 can be allocated. The application allocates the memory for each additional FIFO and initializes a GXFifoObj as well. The following example functions can be used to initialize the GXFifoObj:

```
void GXInitFifoBase(
    GXFifoObj*           fifo,
    void*                base,
    u32                  size);
void GXInitFifoPtrs(
    GXFifoObj*           fifo
    void*                read_ptr.
    void*                write_ptr);
void GXInitFifoLimits(
    GXIFifoObj*          fifo,
    u32                  hi_water_mark,
    u32                  lo_water_mark);
```

Normally, the application only needs to initialize the FIFO read and write pointers to the base address of the FIFO. Once initialized, the system hardware will control the read and write pointers automatically.

Attaching and Saving FIFOs

Once a FIFO has been initialized, it can be attached to the CPU 110 or the graphics processor 114 or both. Only one FIFO may be attached to either the CPU 110 or graphics processor 114 at the same time. Once a FIFO is attached to the CPU 110, the CPU may issue GX commands to the FIFO. When a FIFO is attached to the graphics processor 114, it will be enabled to read graphics commands from the FIFO. The following example functions attach FIFOs:

void GXSetCPUFifo(GXFifoObj* fifo );

void GXSetGPFifo(GXFifoObj* fifo );

GXFifoObj* GXGetCPUFifo ( void );

GXFifoObj* GXGetGPFifo ( void );

One may also inquire which FIFO objects are currently attached with these example functions:

GXFifoObj* GXGetCPUFifo ( void );

GXFifoObj* GXGetGPFifo ( void );

When in multi-buffer mode, and the CPU 110 is finished writing GX commands, the FIFO should be "saved" before switching to a new FIFO. The following example function "saves" the CPU FIFO: void GXSaveCPUFifo (FXFifoObj* fifo );

When a FIFO is saved, the CPU write-gather buffer 111 is flushed to make sure all graphics commands are written to main memory 112. In addition, the current FIFO read and write pointers are stored in the GXFifoObj structure.

Notice that there is no save function for the graphics processor 114. Once a graphics processor is attached, graphics commands will continue to be read until either:

the FIFO is empty, a FIFO breakpoint is encountered, or the GP is preempted.

FIFO Status

The following example functions can be used to read the status of a FIFO and the GP:

```
void GXGetFifoStatus(
    GXFifoObj*      fifo,
    GXBool*         overhi,
    GXBool*         underlo,
    u32*            fifo_cnt,
    GXBool*         cpu_write,
    GXBool*         gp_read,
    GXBool*         fifowrap );
void GXGetGPStatus(
    GXBool*         overhi,
    GXBool*         underlow,
    GXBool*         readIdle,
    GXBool*         cmdIdle,
    GXBool*         brkpt );
```

GXGetFifoStatus gets the status of a specific FIFO. If the FIFO is currently attached to the CPU 110, the parameter cpu_write will be GX_TRUE. When the FIFO is currently attached to the graphics processor 114, the parameter gp_read will be GX_TRUE. When a FIFO is attached to either the CPU 110 or the graphics processor 114, the status will be read directly from the hardware's state. If the FIFO is not attached, the status will be read from the GXFifoObj. GXGetFifoStatus reports whether the specified FIFO has over flowed or has enough room to be written to. In general, the hardware cannot detect when a FIFO overflows, i.e., when the amount of data exceeds the size of the FIFO.

Although there is no general way to detect FIFO overflows, the hardware can detect when the CPU write pointer reaches the top of the FIFO. If this condition has occurred, the "fifowrap" argument will return GX_TRUE. The "fifowrap" argument can be used to detect FIFO overflows if the CPU's write pointer is always initialized to the base of the FIFO. "fifowrap" is set if the FIFO is currently attached to the CPU 110.

GXGetGPStatus can be used to get the status of the graphics processor 114 (regardless of the FIFO that attached to it). The minimum requirement to meet before attaching a new graphics processor FIFO is to wait for the graphics processor 114 to be idle (but additional constraints may also exist). The undertow and overhi statuses indicate where the write pointer is, relative to the high and low water marks.

Example FIFO Flow Control

When a FIFO is attached to both the CPU and GP (immediate mode), care must be taken so that the CPU 110 stops writing commands when the FIFO is too full. A "high water mark" defines how full the FIFO can get before graphics commands will no longer be written to the FIFO. In the preferred embodiment, there may be up to 16 KB of buffered graphics commands in the CPU, so it is recommended to set the high water mark to the (FIFO size—16 KB).

When the high water mark is encountered, the program will be suspended, but other interrupt-driven tasks such as audio will still be service. The programmer may also wish to specify which particular thread in a multi-threaded program should be suspended.

A "low water mark" defines how empty the FIFO must get after reaching a "high water mark" before the program (or thread) is allowed to continue. The low water mark is recommended to be set to (FIFO size/2). The low water mark prevents frequent context switching of the program, since it does not need to poll some register or constantly receive overflow interrupts when the amount of new command data stays close to the high water mark.

When in multi-buffered mode, the high and low water marks are disabled. When a FIFO is attached to the CPU 110, and the CPU writes more commands than the FIFO will hold, the write pointer will be wrapped from the last address back to the base address. Previous graphics commands in the FIFO will be overwritten. It is possible to detect when the write pointer wraps over the top of the FIFO (which indicates an overflow only if the FIFO write pointer was initialized to the base of the FIFO before commands were sent). See GXGetFifoStatus above.

In order to prevent FIFO (buffer) overflow in multi-buffered mode, a software-based checking scheme may be used. The program running on main processor 110 should keep its own counter of the buffer size, and before any group of commands is added to the buffer, the program may check and see if there is room. If room is available, the size of the group may be added to the buffer size. If room is not available, the buffer may be flushed and a new one allocated.

Using Display List Calls

To call a display list from a FIFO buffer 110 in the preferred embodiment, the application first allocates space in memory in which to store the display list. Once the memory area has been set up, the application can then call for example:

```
void GXBeginDisplayList (
    void            *list
    u32             size);
```

Where the "list" argument is the starting address for where the display list will be stored and the "size" argument indicates the number of bytes available in the allocated space for writing display list commands to allow the system to check for overflow.

Once "GXBeginDisplayList" has been called, further GX commands are written to the display list instead of to the normal command FIFO. The "GXEndDisplayList" command signals the end of the display list, and it returns the command steam to the FIFO to which it had been directed previously. The "GXEndDisplayList" command also returns the actual size of the created display list as a multiple of 32 bytes in the example embodiment.

In the example embodiment, display lists cannot be nested. This means that once a GXBeginDisplayList has been issued, it is illegal to issue either another GXBeginDisplayLit or a GXCallDisplayList command until a GXEndDisplayList command comes along. However, in alternate embodiments it would be possible to provide display list nesting to any desired nesting level.

Example Graphics FIFO Functions

The following example functions provide management of the graphics FIFO:

| GXSetFifoBase: | | |
|---|---|---|
| Argument: | | |
| u32 | Base Ptr; | //Set base address of fifo in main memory. |
| u32 | Size: | //Size of the fifo in bytes. (a 32 bytes multiple). |
| GXBool | Set Defaults | //Setup default fifo state. |

Sets the graphics fifo limits. This function is called at initialization time. The fifo address can not be changed unless the graphics pipe is flushed. If SetDefault flag is set, then the fifo is reset (i.e. read/write pointers at fifo base) and interrupts are disabled. By default, the high water mark is set to ⅔ of the size and the low water mark is set to ⅓ of the size.

| GXSetFifoLimits: | | |
|---|---|---|
| Argument | | |
| u32 | HiWaterMark: | //Hi-water mark for the fifo. |
| u32 | LoWaterMark; | //Low water mark. |
| u32 | RdBreakMark; | //Read pointer break point. |

This function sets the fifo limits. When the read pointer goes below low water mark or when write pointer goes above high water mark, the graphics hardware will interrupt the CPU. The RdBreakMark is used for setting read pointer break point.

| GXSetInterrupts: | | |
|---|---|---|
| Argument | | |
| GXBool | Underflow; | //Enable/Disable low water mark interrupt. |
| GXBool | Overflow; | //Enable/Disable high water mark interrupt. |
| GXBool | BreakPoint; | //Enable/Disable fifo read break point. |

Enables or disables fifo related interrupts. The BreakPoint is a feature than can be used to halt fifo reads by the CP while a previous frame is still being copied.

| GXClearInterrupts: | | |
|---|---|---|
| Argument: | | |
| GXBool | Underflow; | //Clear low water mark interrupt |
| GXBool | Overflow; | //Clear high water mark interrupt. |
| GXBool | BreakPoint | //Clear fifo read break point. |

Clears a pending interrupt.

| GXSetFifoPtrs: | | |
|---|---|---|
| Argument: | | |
| u32 | WritePtr; | //Sets write pointer for fifo. |
| u32 | ReadPtr; | //Sets read pointer. |

Sets fifo read and write pointers. These pointers are maintained by the hardware. This function will override the hardware values (e.g., for display list compilation).

| GXGetFifoStatus: | | |
|---|---|---|
| Argument: | | |
| GXBool | *Underflow; | //Fifo count is below low water mark. |
| GXBool | *Overflow; | //Fifo count is above high water mark. |
| GXBool | *BreakPoint; | //Fifo read pointer is at break point. |
| u32 | *FifoCount; | //Number of cachelines (32 bytes) in Fifo. |

Returns fifo status and count.

Example Display List Functions

A display list is an array of pre-compiled commands and data for the graphics pipe. The following example commands are inserted into a FIFO buffer 210 to manipulate display lists.

| GXBeginDisplayList: | | |
|---|---|---|
| Argument: | | |
| void* | BasePtr; | //Address of a buffer in for storing display list data. |
| u32 | nBytes; | //Size of the buffer. |

This function creates and starts a display list. The API is put in display list mode. All API functions, except any of the display list functions, following this call until EndDisplayList, send their data and commands to the display list buffer instead of graphics pipe. A display list can not be nested in this example, i.e., no display list functions can be called between a BeginDisplayList and EndDisplayList. The memory for the display list is allocated by the application.

| GXEndDisplayList: | | |
|---|---|---|
| Argument: | | |
| None. | | |
| Return: | | |
| u32 | nBytes | //Number of bytes used for the display list. |

This function ends currently opened display object and puts the system back in immediate mode.

GXCallDisplayList:

Argument:

| | | |
|---|---|---|
| void* | BasePtr; | //Address of a buffer in for storing display list data. |
| u32 | aBytes; | //Size of the buffer |

This function executes the display list.

Example Register Formats:

The following table shows example registers in the command processor 200 that are addressable by CPU 110:

| Register Name | Bit Fields: | Description |
|---|---|---|
| CP_STATUS Register 834 | 0: | FIFO overflow (fifo_count > FIFO_HICNT) |
| | 1: | FIFO underflow (fifo_count < FIFO_LOCNT) |
| | 2: | FIFO read unit idle |
| | 3: | CP idle |
| | 4: | FIFO reach break point (cleared by disable FIFO break point) |
| CP_ENABLE Register 836 | 0: | Enable FIFO reads, reset value is "0" disable |
| | 1: | FIFO break point enable bit, reset value is "0" disable |
| | 2: | FIFO overflow interrupt enable, reset value is "0" disable |
| | 3: | FIFO underflow interrupt enable, reset value is "0" disable |
| | 4: | FIFO write pointer increment enable, reset value is "1" enable |
| | 5: | FIFO break point interrupt enable, reset value is "0" disable |
| CP_CLEAR Register 838 | 0: | clear FIFO overflow interrupt |
| | 1: | clear FIFO underflow interrupt |
| CP_STM_LOW Register 840 | 7:0 | bits 7:0 of the Streaming Buffer low water mark in 32 bytes increment, default (reset) value is "0x0000" |
| CP_FIFO_BASEL 822 | 15:5 | bits 15:5 of the FIFO base address in memory |
| CP_FIFO_BASE 822 | 9:0 | bits 25:16 of the FIFO base address in memory |
| CP_FIFO_TOPL 824 | 15:5 | bits 15:5 of the FIFO top address in memory |
| CP_FIFO_TOPH 824 | 9:0 | bits 25:16 of the FIFO top address in memory |
| CP_FIFO_HICNTL 826 | 15:5 | bits 15:5 of the FIFO high water count |
| CP_FIFO_HICNTH 826 | 9:0 | bits 25:16 of the FIFO high water count |
| CP_FIFO_LOCNTL 828 | 15:5 | bits 15:5 of the FIFO low water count |
| CP_FIFO_LOCNTH 828 | 9:0 | bits 25:16 of the FIFO low water count |
| CP_FIFO_COUNTL 830 | 15:5 | bits 15:5 of the FIFO_COUNT (entries currently in FIFO) |
| CP_FIFO_COUNTH 830 | 9:0 | bits 25:16 of the FIFO_COUNT (entries currently in FIFO) |
| CP_FIFO_WPTRL 808 | 15:5 | bits 15:5 of the FIFO write pointer |
| CP_FIFO_WPTRH 808 | 9:0 | bits 25:15 of the FIFO write pointer |
| CP_FIFO_RPTRL 804 | 15:5 | bits 15:5 of the FIFO read pointer |
| CP_FIFO_RPTRH 804 | 9:0 | bits 25:15 of the FIFO read pointer |
| CP_FIFO_BRKL 832 | 15:5 | bits 15:5 of the FIFO read address break point |
| CP_FIFO_BRKH 832 | 9:0 | bits 9:0 if the FIFO read address break point |

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with OpenGL, DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 12A:
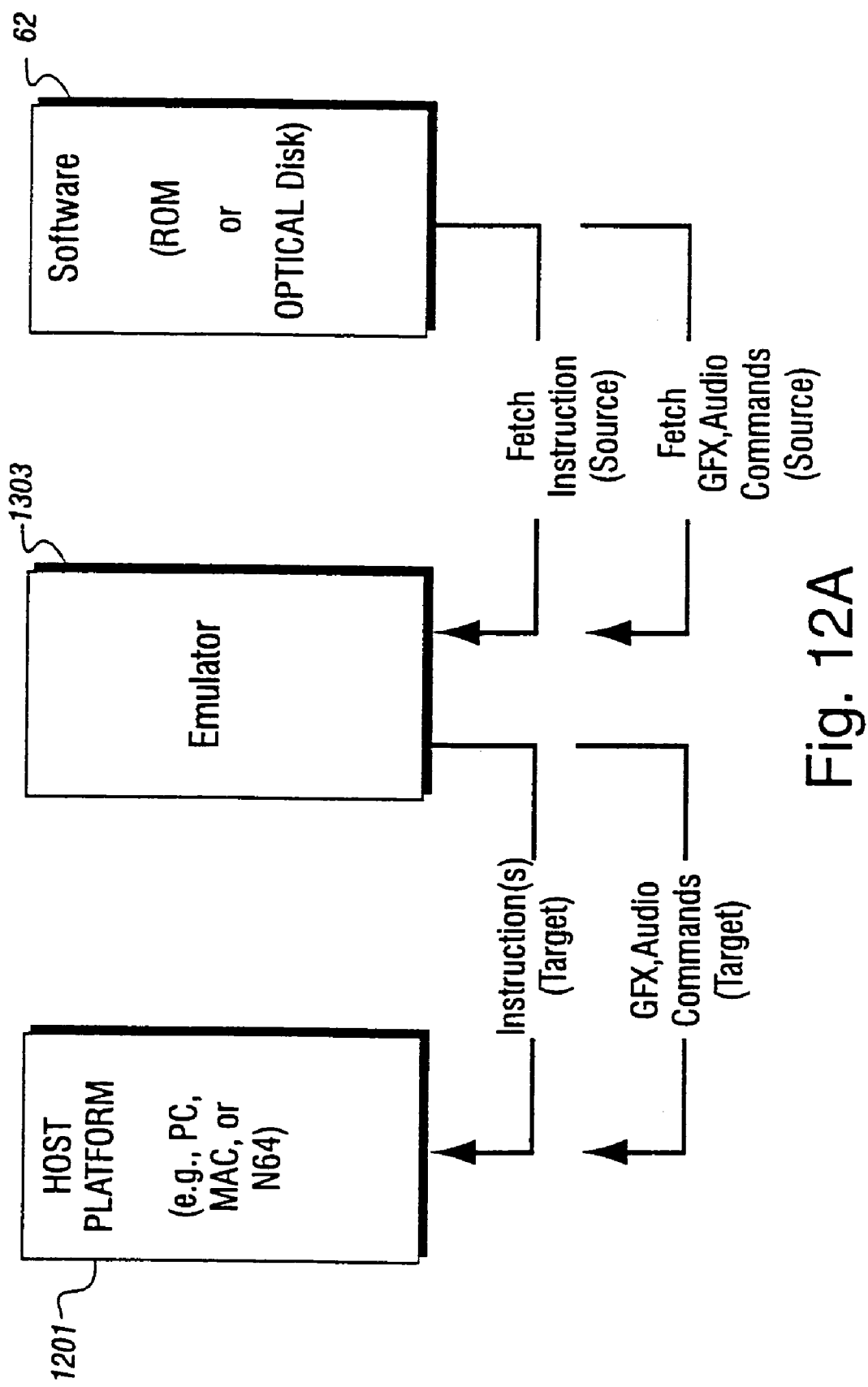
FIGS. 12A and 12B show example alternative compatible implementations.

FIG. 12A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 1305 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

Certain emulators of system 50 might simply "stub" (i.e., ignore) some or all of the buffering and flow control techniques described above since they might have much more memory resources than the example hardware implementation described above. Such emulators will typically respond to requests for buffer allocation by allocating memory resources, but might provide different flow control processing. Status and flow control requests as described above could be emulated by maintaining an emulated state of the hardware, and using that state to respond to the status requests.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 12B:
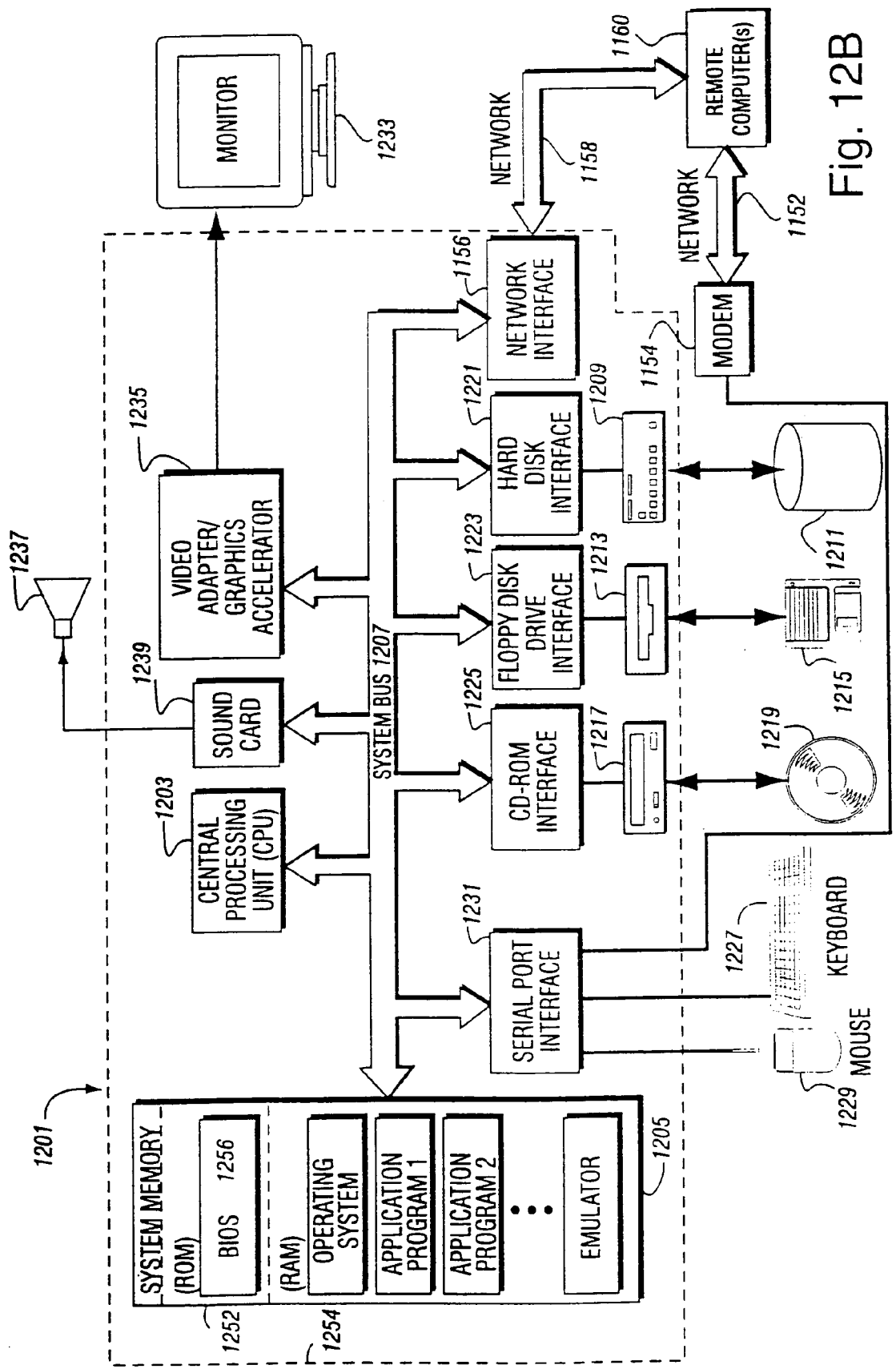

FIG. 12B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

All documents referenced above are hereby incorporated by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A 3D graphics system including:
   a producer that outputs graphics commands, said producer comprising a microprocessor;
   a consumer that consumes the graphics commands outputted by the producer, said consumer comprising graphics hardware including a cache/command processor and pipelined graphics components that transform and rasterize polygons for display; and
   a shared memory coupled to the producer and to the consumer, the shared memory having plural buffers allocated therein, said plural buffers each receiving and temporarily storing graphics commands outputted by the producer for delivery to the consumer, at least some of said commands comprising polygon vertex commands, wherein the producer and the consumer are capable of accessing each said buffer independently of one another,
   wherein said buffers store inline commands calling display lists comprising further graphics commands including polygon vertex commands for execution by said graphics hardware, said display lists being stored elsewhere in said shared memory,
   wherein said polygon vertex commands are provided to said pipelined graphics components, said pipelined graphics components generating images based at least in part on said polygon vertex commands.

2. A graphics system as in claim 1 wherein the producer and the consumer have independent read and/or write pointers.

3. The graphics system of claim 2 wherein the consumer selectively increments the consumer write pointer in response to the producer writing to the active buffer.

4. The graphics system of claim 3 wherein the consumer increments the consumer read pointer as the consumer reads from an active buffer, and suspends reading from the active buffer when the incremented consumer read pointer has a predetermined relationship with the consumer write pointer.

5. A graphics system as in claim 1 wherein the shared memory stores plural variable sized buffers disposed at selected locations within the shared memory.

6. A graphics system as in claim 1 wherein the shared memory stores plural buffers each of which can be independently accessed by the producer and/or the consumer.

7. The graphics system of claim 6 wherein the consumer is incapable of writing to at least an active one of the plural buffers, but maintains, independently of the producer, a write pointer for at least said active one of the plural buffers.

8. The graphics system of claim 6 wherein the producer provides a producer read pointer and a producer write pointer associated with a first of said plural buffers, and the consumer independently maintains a consumer read pointer and a consumer write pointer associated with said first of said plural buffers.

9. The graphics system of claim 6 wherein a first of the plural buffers includes a read command controlling the consumer to consume the display list which the producer has stored elsewhere within the shared memory, and to resume consuming graphics commands from the first buffer after consuming the display list stored elsewhere.

10. The graphics system of claim 9 wherein the read command specifies a starting address and a length of the display list, the read command controlling the consumer to read the display list of the specified length beginning at the specified starting address.

11. The graphics system of claim 1 wherein at least one of said buffers provides circular first-in-first-out access.

12. The graphics system of claim 1 wherein at least one of said buffers provides first-in-first-out access.

13. The graphics system of claim 1 wherein at least one of the buffers can be selectively attached to both the producer and the consumer simultaneously.

14. The graphics system of claim 1 wherein at least one of the buffers is attached to the producer while a further of said plural buffers is attached to the consumer.

15. The system of claim 1 wherein at least one of the buffers is first attached to the producer, and is subsequently detached from the producer and attached to the consumer.

16. The system of claim 1 wherein at least one of the buffers can be attached to the producer, the consumer, or both.

17. The system of claim 1 wherein only one of said plural buffers is attached to the producer at a time.

18. The system of claim 1 wherein only one of said plural buffers is attached to the consumer at a time.

19. The system of claim 1 wherein each of the buffers has a maximum size of 16 KB.

20. The system of claim 1 wherein the producer sets the size of the buffers.

21. The system of claim 1 wherein at least one of the buffers is dynamically sized to store a frame of graphics commands.

22. The system of claim 1 wherein the producer declares the plural buffers by issuing graphics buffer initialization commands specifying buffer starting address and buffer length.

23. The system of claim 1 wherein at least one of the buffers has a length that is a multiple of 32 bytes and has a minimum size of 64 KB.

24. The graphics system of claim 1 wherein the producer may write a breakpoint into at least one of the buffers, the consumer suspending consumption of graphics commands upon encountering the breakpoint.

25. The system of claim 1 wherein at least one of the buffers has an overflow status indicator indicating when the producer overwrites a location therein.

26. The system of claim 1 further including a hardware status register that indicates the status of at least one of the plural buffers.

27. The system of claim 26 wherein the status register includes the following parameters:
position of a producer write pointer relative to buffer full and buffer empty;
buffer overflow;
whether the producer is currently writing into the at least one buffer; and
whether the consumer is currently reading from the at least one buffer.

28. The system of claim 1 further including a hardware controller coupled to at least one of the plural buffers, the hardware controller providing flow control logic to prevent writes from overrunning reads.

29. The system of claim 1 further including a hardware controller coupled to at least one of the buffers, the hardware controller wrapping read and write pointers from a last location to a first location thereof.

30. The system of claim 1 wherein the producer dynamically allocates said buffers within the shared memory.

31. A 3D graphics system including:
a memory shared between a producer and a consumer;
a storage buffer allocated within said shared memory, said storage buffer receiving and temporarily storing graphics commands;
a producer that writes graphics commands into said buffer, said producer maintaining a producer write pointer and a producer read pointer associated with the buffer, said producer comprising a microprocessor; and
a consumer that consumes the graphics commands stored within the buffer, said consumer comprising graphics hardware including a cache/command processor and pipelined graphics components that transform and rasterize polygons for display, the consumer maintaining a consumer write pointer that is independent of the producer write pointer, and a consumer read pointer that is independent of the producer read pointer,
wherein said buffer stores an inline command calling a display command list stored elsewhere in said shared memory for execution by said consumer, said display command list comprising polygon vertex commands that control said pipelined graphics components to draw polygons for display.

32. The graphics system of claim 31 wherein the consumer increments the consumer read pointer each time the consumer consumes from the buffer, and suspends consumption from the buffer when the consumer read pointer has a predetermined relationship with the consumer write pointer.

33. The graphics system of claim 31 wherein the consumer selectively auto-increments the consumer write pointer in response to the producer writing to the buffer.

34. A graphics system including:
   a storage buffer that receives and temporarily stores graphics commands;
   a producer that writes graphics commands into said buffer, said producer maintaining a producer write pointer and a producer read pointer associated with the buffer; and
   a consumer that consumes the graphics commands stored within the buffer, the consumer maintaining a consumer write pointer that is independent of the producer write pointer, and a consumer read pointer that is independent of the producer read pointer,
   wherein the producer sends the consumer a configuration command specifying whether the consumer should auto-increment the consumer write pointer in response to producer writes to the buffer.

35. In a 3D graphics system including a graphics command producer that writes graphics commands into a buffer based on a producer write pointer, said command producer allocating said buffer within a memory shared by said command producer and a graphics command consumer, the graphics command consumer reading graphics commands from the buffer based on a consumer read pointer, said graphics command consumer comprising graphics hardware including a cache/command processor and pipelined graphics components that transform and rasterize polygons for display,
   an improvement comprising:
   a consumer write pointer independently maintained by the consumer, the consumer write pointer indicating the extent of valid data the producer has written into said buffer, the consumer ceasing to consume graphics commands from the buffer upon the consumer read pointer having a predetermined relationship to the consumer write pointer,
   wherein said buffer stores an inline command calling a list of graphics commands stored elsewhere in said shared memory for execution by said consumer, said called list of graphics commands including polygon vertex commands that command said pipelined graphics components to draw polygons for display.

36. In an interactive 3D graphics system including a processor module executing an application, a graphics processor module and at least one memory coupled to the processor module and to the graphics processor module, a method of controlling the flow of graphics commands between the processor module and the graphics processor module comprising:
   dynamically establishing, under control of the application, a variable number of FIFO buffers in the memory, the application specifying the size of each of the FIFO buffers;
   the application controlling the processor module to write graphics commands into at least a first of the plurality of FIFO buffers; and
   the application sending graphics commands to the graphics processor module that control the graphics processor module to read, independently of said processor writes, the graphics command from the first FIFO buffer,
   wherein said application stores, into at least one of the FIFO buffers, an inline command calling a list of graphics commands stored elsewhere in said memory for execution by said graphics module, said called list of graphics commands including polygon vertex commands that command said graphics module to draw polygons for display.

37. The graphics system of claim 36 wherein the processor module provides a processor module read pointer and a processor module write pointer associated with a first of said plurality of buffers, and the graphics processor module independently maintains a graphics processor module read pointer and a graphics processor module write pointer associated with said first buffer.

38. The graphics system of claim 36 wherein the graphics processor module increments the graphics processor module read pointer each time the graphics processor module reads from the first buffer, and suspends reading from the first buffer when the graphics processor module read pointer has a predetermined relationship with the graphics processor module write pointer.

39. The graphics system of claim 36 wherein the graphics processor module selectively auto-increments the graphics processor module write pointer in response to the processor module writing to the first buffer.

40. The graphics system of claim 36 wherein the graphics processor module maintains, independently of the processor module, a write pointer for at least an active one of the plurality of buffers.

41. The method of claim 36 further including setting a breakpoint, and at least temporarily suspending the graphics processor module from reading a buffer in response to the graphics processor module encountering the breakpoint.

42. The method of claim 36 wherein the selectively controlling step includes suspending the processor module from writing to the buffer upon detection of an overflow.

43. A 3D graphics system including:
   a shared memory that receives and temporarily stores graphics commands;
   a producer that writes commands into a buffer within said shared memory, said producer comprising a microprocessor, said commands including a first set of graphics commands and a command referencing a second set of graphics commands stored elsewhere within said shared memory; and
   a consumer that consumes the first set of graphics commands stored within the buffer and, in response to encountering the referencing command, consumes the second set of graphics commands referenced thereby and subsequently returns to the buffer to consume additional commands therefrom, said consumer comprising graphics hardware including a cache/command processor and further graphics pipeline components that transform and rasterize polygons for display,
   wherein said buffer stores an inline command calling a list of display commands stored elsewhere in said shared memory for execution by said consumer, said called list of graphics commands including polygon vertex commands that command said graphics pipeline components to draw polygons for display.

44. The graphics system of claim 43 wherein the buffer is a circular buffer.

45. The graphics system of claim 43 wherein the consumer is incapable of writing to the buffer, but maintains, independently of the producer, a write pointer for the buffer.

46. A graphics system including:
   a storage device that receives and temporarily stores graphics commands;
   a producer that writes commands into a buffer within said storage device, said commands including a first set of graphics commands and a command referencing a second set of graphics commands stored elsewhere within said storage device; and a consumer that consumes the first set of graphics commands stored within the buffer and, in response to encountering the referencing command, consumes the second set of graphics commands referenced thereby and subsequently returns to the buffer to consume additional commands therefrom, wherein the referencing command specifies a starting address of a display list, the referencing command controlling the consumer to read the display list beginning at the specified starting address.

47. A 3D graphics system including:
a storage device that receives and temporarily stores graphics commands;
a producer that writes commands into a buffer within said storage device, said commands including a first set of graphics commands and a command referencing a second set of graphics commands stored elsewhere within said storage device; and
a consumer that consumes the first set of graphics commands stored within the buffer and, in response to encountering the referencing command, consumes the second set of graphics commands referenced thereby and subsequently returns to the buffer to consume additional commands therefrom, wherein the referencing command specifies a number of data units the consumer is to consume.

48. In a 3D graphics system, a method for passing graphics commands from a producer of graphics commands, said producer comprising a microprocessor, to a consumer of graphics commands, said consumer comprising graphics hardware including a cache/command processor and further graphics pipeline components that transform and rasterize polygons for display, the method comprising:
creating plural variable sized buffers disposed at variable locations within a memory coupled to the producer and the consumer,
temporarily storing graphics commands produced by the producer in the variable sized buffers;
writing, into at least one said buffers, an inline command calling a list of display commands stored elsewhere in the memory;
consuming the graphics commands from the variable sized buffers with the consumer by accessing the buffers independently of the producer;
executing the list of display commands in response to said inline command within said at least one buffer, said list of display commands including polygon vertex commands specifying vertices of polygons to draw within a graphics image;
after consuming the list of display commands, accessing further graphics command within said buffer having said inline command calling said display list written therein; generating at least a part of said graphics image based at least in part on the consumed graphics commands and said executed display list; and outputting the generated part of said graphics image to a display.

49. The method of claim 48 wherein the consumer is incapable of writing to at least an active one of the plural buffers, and the method further includes the consumer maintaining, independently of the producer, a write pointer for at least said active one of the plural buffers.

50. The method of claim 48 further including maintaining, with the producer, a producer read pointer and a producer write pointer associated with a first of said plural buffers, and the independently maintaining, with the consumer, a consumer read pointer and a consumer write pointer associated with said first of said plural buffers.

51. The method of claim 50 further including incrementing, with the consumer, a consumer read pointer as the consumer reads from an active buffer, and suspending reading from the active buffer when the incremented consumer read pointer has a predetermined relationship with the consumer write pointer.

52. The method of claim 51 further including selectively incrementing the consumer write pointer in response to the producer writing to the active buffer.

53. The method of claim 48 wherein a first of the plural buffers includes a read command, and the method further includes:
(a) consuming the display list the producer has stored elsewhere within the memory in response to encountering the read command, and
(b) resuming consumption of graphics commands from the first buffer after consuming the display list stored elsewhere.

54. The method of claim 53 wherein the read command specifies a starting address and a length of the display list, and step (a) includes controlling the consumer to read the display list of the specified length beginning at the specified starting address.

55. The method of claim 48 wherein a first of the plural buffers provides circular first-in-first-out access.

56. The method of claim 48 wherein a first of the plural buffers provides first-in-first-out access.

57. The method of claim 48 further including selectively attaching any of the plural buffers to both the producer and the consumer simultaneously.

58. The method of claim 48 further including attaching a first of the plural buffers to the producer and attaching a second of the plural buffers to the consumer.

59. The method of claim 48 further including attaching a first of the plural buffers to the producer, and subsequently detaching the first buffer from the producer and attaching the first buffer to the consumer.

60. The method of claim 48 further including attaching any of the plural buffers to the producer, the consumer, or both.

61. The method of claim 48 further including attaching only one of the plural buffers to the producer at a time.

62. The method of claim 48 further including attaching only one of the plural buffers to the consumer at a time.

63. A method for producing 3D images including:
maintaining a producer write pointer and a producer read pointer associated with a buffer allocated within a memory shared by the producer and a consumer;
writing graphics commands, including an inline display list call, into the buffer, and updating at least the write pointer in response to the writing;
maintaining, in association with the buffer, a consumer write pointer that is independent of the producer write pointer, and a consumer read pointer that is independent of the producer read pointer;
the consumer consuming the graphics commands stored within the buffer, including accessing a display list comprising polygon vertex graphics commands stored elsewhere within said memory in response to encountering said inline display list call within said buffer, updating at least the read pointer in response to the consuming, and, after executing the display list, accessing and consuming further graphics command disposed sequentially within said buffer after the inline display list call; producing at least a part of a graphics image at least in part in response to the consuming and executing step; and outputting the generated part of said graphics image to a display.

64. A method of producing 3D images including:

writing commands into a buffer within a shared memory, said commands including a first set of graphics commands and a command referring to a display list stored elsewhere within said shared memory;

consuming the first set of graphics commands stored within the buffer;

in response to encountering the referring command, executing polygon vertex commands in the display list and subsequently automatically returning to consume additional commands from the buffer; generating at least a part of an image at least in part in response to the consumed first set of graphics commands and said display list; and outputting the generated part of said graphics image to a display.

65. A method of supplying 3D graphics commands to a 3D graphics command consumer comprising:

(a) storing a command sequence beginning at a predetermined storage location;

(b) supplying a graphics command stream through a FIFO buffer to the consumer, the stream including at least one command that refers the command consumer to a display list comprising polygon vertex commands stored beginning at the predetermined storage location; and (c) the graphics command consumer executing said display list polygon vertex commands beginning at the predetermined storage location in response to encountering said at least one command that refers the command consumer to the display list, wherein the producer returns to access additional portions of said graphics command stream from the FIFO buffer after consuming the command sequence beginning at the predetermined storage location; wherein the graphics command consumer executes said display list polygon vertex commands to generate at least a part of a graphics image and outputting the generated part of said graphics image to a display.

66. A method of efficiently generating successive graphics images on a display device, comprising:

writing commands into a memory buffer, said commands including at least a first set of graphics commands and at least one calling command that calls a further, prestored list of display commands;

consuming, with a 3D graphics engine, at least some of the first set of graphics commands to generate at least a portion of a first image in a frame buffer memory;

in response to encountering the calling command, reading the stored display commands in the display list with the 3D graphics engine and responsively generating at least a further portion of said first image in said frame buffer memory;

the 3D graphics engine subsequently automatically returning from said called display list to consume additional ones of the first set of graphics commands stored in said memory buffer to generate at least an additional portion of the first graphics display image in the frame buffer memory;

displaying the first graphics display image on the display device;

writing additional commands into the same or different memory buffer, said additional commands including at least a second set of graphics commands and at least one calling command that calls the same further, prestored list of display commands;

consuming, with the 3D graphics engine, at least some of the second set of graphics commands to generate at least a portion of a second image in the same or different frame buffer memory;

in response to encountering the calling command, reading the commands in said prestored display list with the 3D graphics engine and responsively generating at least a further portion of said second image in said same or different frame buffer memory, thereby reusing said further, stored list of display commands to generate said second image;

subsequently automatically returning from said called display list to consume, with the 3D graphics engine, additional ones of the second set of graphics commands stored in said memory buffer to generate at least an additional portion of the second graphics display image in the same or different frame buffer memory; and displaying the second graphics display image on the display device based on the contents of said same or different frame buffer memory.

67. The method of claim 66 wherein said consuming comprises consuming in a first-in-first-out order, thereby relaxing the degree to which the 3D graphics engine needs to be synchronized to the graphics command producer.

68. The method of claim 66 further including allocating a variable number of variable sized memory buffers for receiving and storing graphics command sets.

* * * * *